(12) United States Patent
Sesti et al.

(10) Patent No.: US 11,635,672 B2
(45) Date of Patent: Apr. 25, 2023

(54) VEHICULAR CAMERA ASSEMBLY PROCESS USING WELDING TO SECURE LENS RELATIVE TO CAMERA IMAGE PLANE

(71) Applicant: Magna Electronics Inc., Auburn Hills, MI (US)

(72) Inventors: Matthew C. Sesti, Williamston, MI (US); Robert A. Devota, Durand, MI (US); Donald W. Mersino, Montrose, MI (US); Gavin E. Skrocki, Bay City, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 22 days.

(21) Appl. No.: 17/303,784

(22) Filed: Jun. 8, 2021

(65) Prior Publication Data

US 2021/0382375 A1     Dec. 9, 2021

Related U.S. Application Data

(60) Provisional application No. 62/706,799, filed on Sep. 11, 2020, provisional application No. 62/705,028, filed on Jun. 8, 2020.

(51) Int. Cl.
| | |
|---|---|
| *G03B 17/12* | (2021.01) |
| *G03B 30/00* | (2021.01) |
| *G02B 27/62* | (2006.01) |
| *H04N 23/54* | (2023.01) |
| *B60R 16/02* | (2006.01) |
| *H04N 23/55* | (2023.01) |
| *H04N 23/67* | (2023.01) |

(52) U.S. Cl.
CPC ........... *G03B 17/12* (2013.01); *B60R 16/0207* (2013.01); *G02B 27/62* (2013.01); *G03B 30/00* (2021.01); *H04N 23/54* (2023.01); *H04N 23/55* (2023.01); *H04N 23/67* (2023.01)

(58) Field of Classification Search
CPC ........ G03B 17/21; G03B 30/00; G02B 27/62; H04N 5/2253; H04N 5/2254
See application file for complete search history.

(56) References Cited

U.S. PATENT DOCUMENTS

| | | |
|---|---|---|
| 5,412,510 A | 5/1995 | Iizuka et al. |
| 5,550,677 A | 8/1996 | Schofield et al. |
| 5,670,935 A | 9/1997 | Schofield et al. |

(Continued)

*Primary Examiner* — Noam Reisner
(74) *Attorney, Agent, or Firm* — Honigman LLP

(57) ABSTRACT

A vehicular camera includes a lens barrel accommodating a lens and having at least two radial protrusions protruding radially outward at or near an inner end of the lens barrel. A lens holder includes a passageway for receiving the inner end of the lens barrel and has at least two slots extending longitudinally from a board end of the lens holder. The lens barrel is received in the lens holder and the board end of the lens holder is attached at an imager printed circuit board with the imager facing the lens. The radial protrusions are movable within the slots while the lens barrel is adjusted relative to the imager to align the lens at the imager. After the lens is aligned relative to the imager, the radial protrusions within the slots are welded to the lens holder to secure the lens barrel relative to the imager printed circuit board.

21 Claims, 21 Drawing Sheets

(56) References Cited

U.S. PATENT DOCUMENTS

| | | |
|---|---|---|
| 5,949,331 A | 9/1999 | Schofield et al. |
| 5,978,017 A | 11/1999 | Tino |
| 6,151,065 A | 11/2000 | Steed et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,480,149 B2 | 1/2009 | DeWard et al. |
| 7,595,943 B2 | 9/2009 | Yuan |
| 7,720,580 B2 | 5/2010 | Higgins-Luthman |
| 7,855,755 B2 | 12/2010 | Weller et al. |
| 7,965,336 B2 | 6/2011 | Bingle et al. |
| 8,256,821 B2 | 9/2012 | Lawlor et al. |
| 8,542,451 B2 | 9/2013 | Lu et al. |
| 8,994,878 B2 | 3/2015 | Byrne et al. |
| 9,077,098 B2 | 7/2015 | Latunski |
| 9,233,641 B2 | 1/2016 | Sesti et al. |
| 9,277,104 B2 | 3/2016 | Sesti et al. |
| 9,451,138 B2 | 9/2016 | Winden et al. |
| 9,487,159 B2 | 11/2016 | Achenbach |
| 9,596,387 B2 | 3/2017 | Achenbach et al. |
| 9,621,769 B2 | 4/2017 | Mai et al. |
| 9,871,971 B2 | 1/2018 | Wang et al. |
| 9,896,039 B2 | 2/2018 | Achenbach et al. |
| 10,142,532 B2 | 11/2018 | Mleczko |
| 10,207,646 B2 | 2/2019 | Oh |
| 10,230,875 B2 | 3/2019 | Mleczko et al. |
| 10,250,004 B2 | 4/2019 | Conger et al. |
| 10,264,219 B2 | 4/2019 | Mleczko et al. |
| 10,272,857 B2 | 4/2019 | Conger et al. |
| 10,274,812 B1 | 4/2019 | Chen |
| 10,676,041 B2 | 6/2020 | Sesti et al. |
| 2001/0055073 A1 | 12/2001 | Shinomiya |
| 2003/0090569 A1 | 5/2003 | Poechmueller |
| 2003/0128291 A1 | 7/2003 | Harazono et al. |
| 2004/0069998 A1 | 4/2004 | Harazono |
| 2007/0058964 A1* | 3/2007 | Shangguan .......... H04N 5/2254 396/144 |
| 2007/0146908 A1 | 6/2007 | Li |
| 2007/0200053 A1 | 8/2007 | Nomura et al. |
| 2009/0244361 A1 | 10/2009 | Gebauer et al. |
| 2011/0025850 A1 | 2/2011 | Maekawa et al. |
| 2011/0279675 A1 | 11/2011 | Mano et al. |
| 2011/0298925 A1 | 12/2011 | Inoue et al. |
| 2012/0019940 A1* | 1/2012 | Lu .................... H01L 27/14618 359/819 |
| 2013/0130937 A1 | 5/2013 | Sun et al. |
| 2013/0183499 A1 | 7/2013 | Kido et al. |
| 2013/0242099 A1 | 9/2013 | Sauer et al. |
| 2014/0298642 A1 | 10/2014 | Sesti et al. |
| 2014/0373345 A1 | 12/2014 | Steigerwald |
| 2015/0015713 A1 | 1/2015 | Wang et al. |
| 2015/0029337 A1 | 1/2015 | Uchiyama et al. |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2015/0379361 A1 | 12/2015 | Boulanger |
| 2016/0037028 A1 | 2/2016 | Biemer |
| 2016/0191863 A1 | 6/2016 | Minikey, Jr. et al. |
| 2016/0243987 A1 | 8/2016 | Kendall |
| 2016/0268716 A1 | 9/2016 | Conger et al. |
| 2016/0284752 A1 | 9/2016 | Shi |
| 2016/0286103 A1 | 9/2016 | Van Dan Elzen |
| 2017/0036600 A1 | 2/2017 | Whitehead et al. |
| 2017/0054881 A1 | 2/2017 | Conger et al. |
| 2017/0126938 A1 | 5/2017 | Newiger |
| 2017/0129419 A1 | 5/2017 | Conger et al. |
| 2017/0133811 A1 | 5/2017 | Conger et al. |
| 2017/0201661 A1 | 7/2017 | Conger |
| 2017/0280034 A1 | 9/2017 | Hess et al. |
| 2017/0295306 A1 | 10/2017 | Mleczko |
| 2017/0302829 A1 | 10/2017 | Mleczko et al. |
| 2018/0027151 A1 | 1/2018 | Kazama et al. |
| 2018/0033741 A1 | 2/2018 | Dubey et al. |
| 2018/0042106 A1 | 2/2018 | Scheja |
| 2018/0072239 A1 | 3/2018 | Wienecke et al. |
| 2018/0098033 A1* | 4/2018 | Mleczko ................ H04N 7/183 |
| 2018/0364441 A1 | 12/2018 | Hubert et al. |
| 2019/0052782 A1* | 2/2019 | Sung .................... B23K 26/32 |
| 2019/0121051 A1 | 4/2019 | Byrne et al. |
| 2019/0124238 A1 | 4/2019 | Byrne et al. |
| 2019/0124243 A1 | 4/2019 | Mleczko et al. |
| 2019/0129281 A1 | 5/2019 | Chen |
| 2019/0166289 A1 | 5/2019 | Knutsson et al. |
| 2019/0306966 A1 | 10/2019 | Byrne et al. |
| 2019/0355606 A1 | 11/2019 | Flotgen |
| 2020/0001787 A1 | 1/2020 | Lu et al. |
| 2020/0010024 A1 | 1/2020 | Sesti et al. |
| 2020/0033549 A1 | 1/2020 | Liu et al. |
| 2020/0070453 A1 | 3/2020 | Piotrowski et al. |
| 2020/0099837 A1* | 3/2020 | Diesel .................... G02B 7/021 |
| 2020/0137926 A1 | 4/2020 | Wohlte |
| 2020/0154020 A1 | 5/2020 | Byrne et al. |
| 2020/0172019 A1 | 6/2020 | Ding et al. |
| 2020/0204711 A1 | 6/2020 | Guidi et al. |
| 2020/0333619 A1 | 10/2020 | Ang et al. |
| 2020/0412925 A1 | 12/2020 | Byrne et al. |
| 2021/0072621 A1* | 3/2021 | Faridian ............... H04N 5/2254 |
| 2021/0103119 A1 | 4/2021 | Reckker et al. |

\* cited by examiner

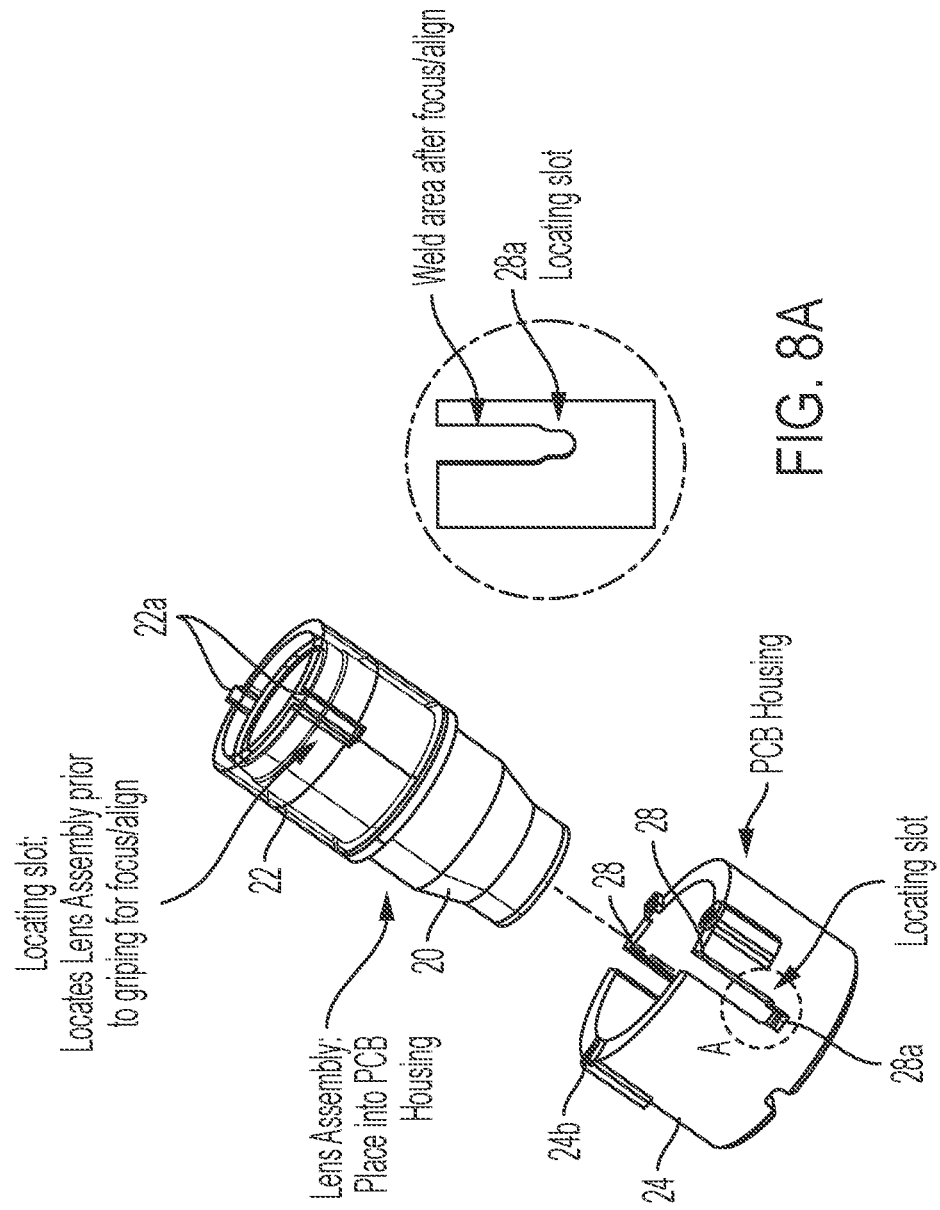

VEHICULAR CAMERA ASSEMBLY PROCESS USING WELDING TO SECURE LENS RELATIVE TO CAMERA IMAGE PLANE

CROSS REFERENCE TO RELATED APPLICATIONS

The present application claims the filing benefits of U.S. provisional application Ser. No. 62/706,799, filed Sep. 11, 2020, and U.S. provisional application Ser. No. 62/705,028, filed Jun. 8, 2020, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 7,965,336; 5,949,331; 5,670,935 and/or 5,550,677, which are hereby incorporated herein by reference in their entireties.

SUMMARY OF THE INVENTION

A driver assistance system or vision system or imaging system for a vehicle utilizes one or more cameras to capture image data representative of images exterior of the vehicle. The camera includes a lens holder and an imager printed circuit board (imager PCB), with the imager PCB fixed to the lens holder, and with a lens barrel (accommodating a lens or lens assembly therein) attached at the lens holder.

According to an aspect of the present invention, the lens barrel is received in the lens holder and has structural elements or radial protrusions, such as tabs or wings, that are received in and that are initially movable within slots partially along the lens barrel. The lens holder (with the lens barrel movably disposed thereat and with the tabs or wings received in the slots) is attached at the imager PCB (such as via a plurality of fasteners). After the imager PCB is secured at the lens holder, the lens barrel may be axially and/or radially adjusted and/or tilted to adjust the focus and optical alignment of the lens relative to the imager. With the lens barrel optically aligned and focused relative to the imager, the tabs or wings of the lens barrel are welded to the lens holder at the slots to secure the lens barrel relative to the lens holder and relative to the imager.

According to another aspect of the invention, the camera assembly may allow for focus and alignment of the lens relative to the imager via adjustment of a lens holder and lens washer relative to the imager PCB and adjustment of the lens barrel relative to the lens washer and welding of the lens barrel at the washer and welding of the washer at the PCB. The washer allows for adjustment of the lens barrel in directions parallel to the imaging plane, and allows for adjustment of the lens barrel in a direction perpendicular to the imaging plane, and allows for rotation and/or tilting of the lens barrel relative to the imaging plane.

According to another aspect of the invention, a camera includes a front housing or lens holder and a rear housing. A lens barrel is received in the front housing and may be fixedly disposed thereat. An imager PCB is fixedly attached to an interior surface of the rear housing. The rear housing (with the imager PCB disposed within) is engaged with the front housing (with the lens barrel received thereat) and a weld washer is disposed at the engagement interface of the front and rear housings. The rear housing is adjusted (axially and/or radially and/or tilted) to focus and optically align the imager with the lens. With the imager optically aligned and focused relative to the lens, the weld washer is welded to the front and rear housing to secure the front holder to the rear housing and the lens relative to the imager. The washer allows for adjustment of the rear housing relative to the lens holder and lens barrel in directions parallel to the imaging plane, and allows for adjustment of the rear housing relative to the lens holder and lens barrel in a direction perpendicular to the imaging plane, and allows for rotation and/or tilting of the rear housing relative to the lens holder and lens barrel.

These and other objects, advantages, purposes and features of the present invention will become apparent upon review of the following specification in conjunction with the drawings.

BRIEF DESCRIPTION OF THE DRAWINGS

FIG. 8 is an exploded perspective view of the lens-retainer subassembly and lens holder;

FIG. 8A is an enlarged view of section A of FIG. 8, showing one of the slots of the lens holder;

DESCRIPTION OF THE PREFERRED EMBODIMENTS

A vehicle vision system and/or driver assist system and/or object detection system and/or alert system operates to capture images exterior of the vehicle and may process the captured image data to detect objects at or near the vehicle and in the predicted path of the vehicle. For example, a forward viewing camera disposed at and behind the windshield of the vehicle may capture image data of the scene forward of the vehicle for one or more driving assist systems of the vehicle. Optionally, one or more other cameras may be disposed at the vehicle with exterior fields of view, whereby the image data captured by those cameras may be processed for object detection and/or used to generate video images for viewing by the driver of the vehicle, such as to assist a driver of the vehicle in maneuvering the vehicle in a rearward direction. The vision system includes an image processor or image processing system that is operable to receive image data from one or more cameras and provide an output to a vehicle system and/or to a display device for displaying images representative of the captured image data. Optionally, the vision system may provide display, such as a rearview display or a top down or bird's eye or surround view display or the like.

Figure 1:
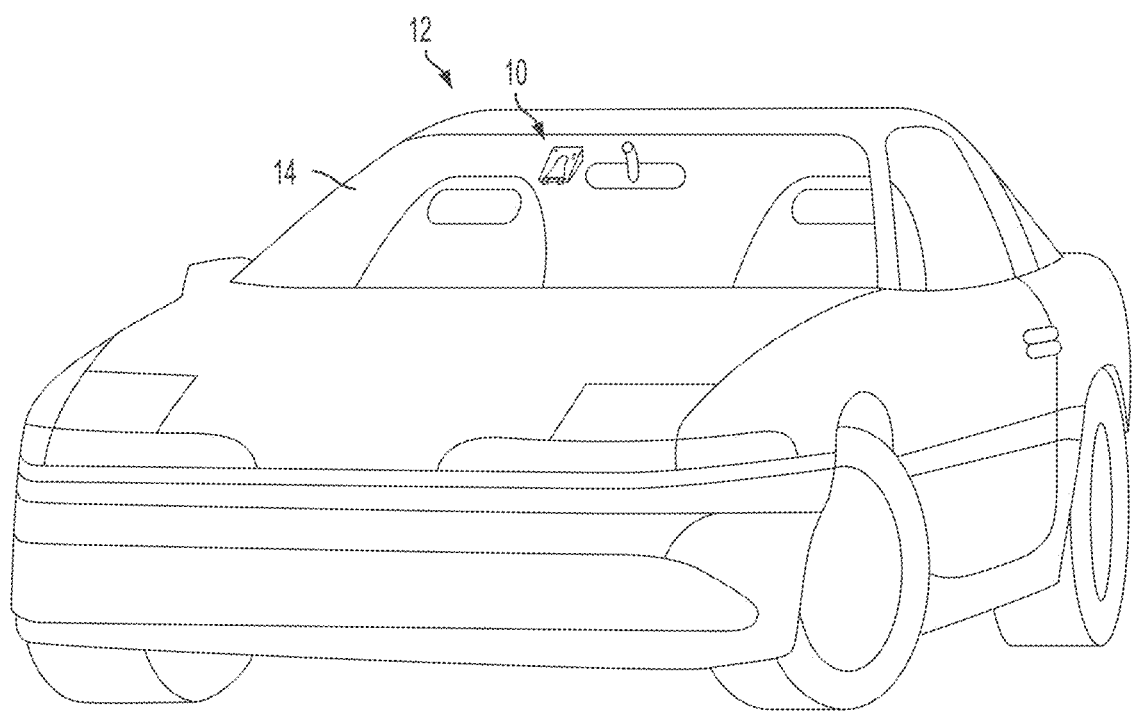
FIG. 1 is a perspective view of a vehicle with a vision system that incorporates a camera.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle.

Typically, active focus and alignment is used to set and secure a focal position of a lens to an imager component. However, this leads to expensive and complicated measures to manage the compliance tolerances created by camera components and manufacturing focus/alignment processes. For example, a camera may be assembled using an active PCB alignment, which may use screws to secure the PCB to the lens holder or front camera housing. After the PCB is secured to the lens holder, the lens barrel (such as a threaded lens barrel) is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the housing using screws and the lens is actively moved to set focus and alignment, whereby a quick cure adhesive is used to set the focus and alignment of the lens relative to the imager. The adhesive acts as a compliant material (before it is cured) to allow for focus and alignment, which is achieved by moving the lens relative to the lens holder. Optionally, the adhesive may be at least partially cured via ultraviolet (UV) light and may further be cured via additional curing. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the housing or lens holder utilizing adhesive initially, and then the imager PCB is actively moved relative to the housing or lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder. The UV and additional curing increases the tolerance stack of the finished assembly, and quick cure adhesives require UV and additional curing. This curing increases the tolerance stack of the finished assembly.

Figure 2:
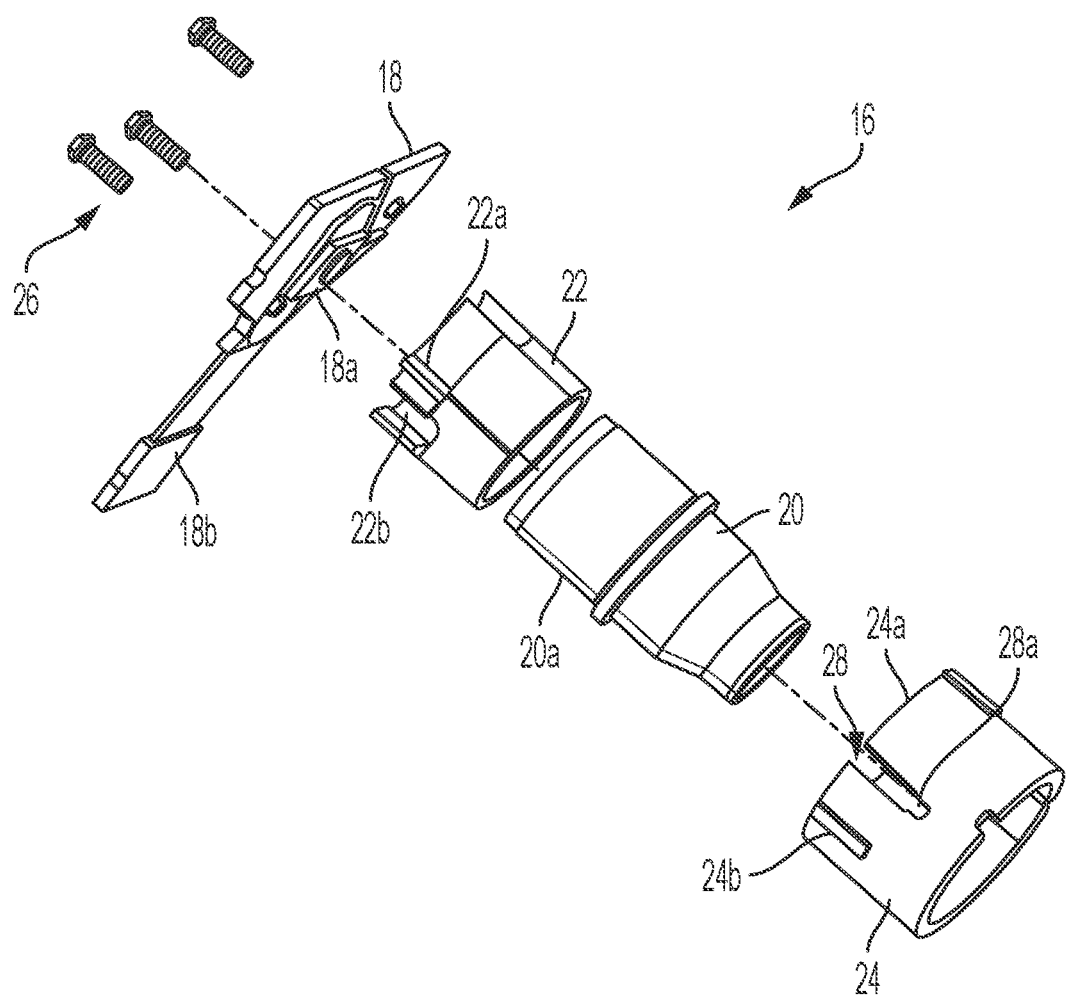
FIGS. 2 and 3 are exploded perspective views of part of a camera.
Figure 3:
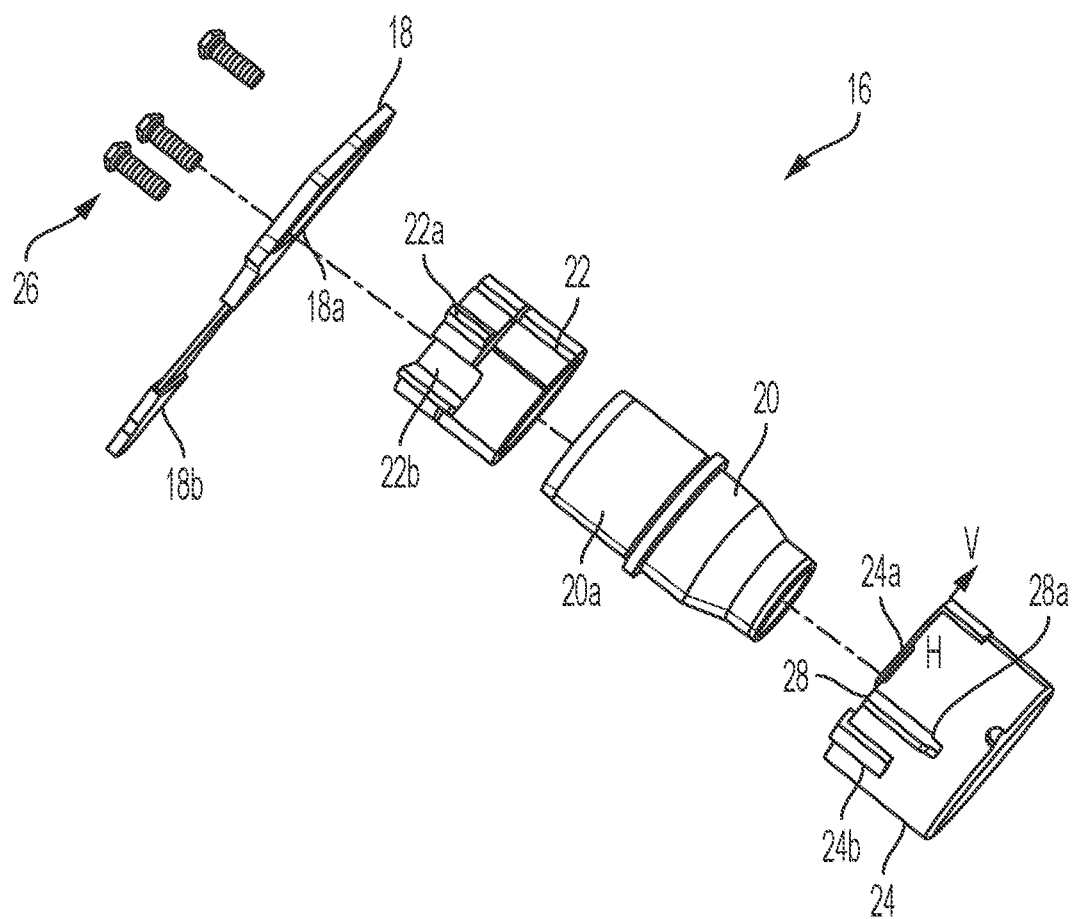

Referring now to FIGS. 2 and 3, an alternative build assembly process utilizes laser welding to secure the lens barrel relative to the lens holder and imager. The focus and alignment process allows for all degrees of freedom to be compensated for with adjusting the lens barrel relative to the PCB for alignment and focus of the lens relative to the imager.

As shown in FIG. 2, the imager assembly or camera 16 comprises an imager printed circuit board (PCB) 18 having an imager 18a disposed thereat and a flexible electrical connector 18b (e.g., a flexible ribbon cable or the like) extending therefrom for electrical connection to a processing printed circuit board of the camera. The imager assembly 16 also includes a lens barrel 20 that is received within a winged retainer 22 and that is fixed relative to the retainer, such as via an adhesive or press-fit or the like. The lens barrel 20 accommodates a lens or lens assembly (comprising a plurality of lens optics or elements) and has an inner end 20a, which is received in a passageway of the winged retainer 22. The imager assembly 16 also includes a lens holder 24 that is fastened to the imager PCB 18, such as via a plurality of fasteners 26.

The lens holder 24 comprises one or more slots 28 (preferably at least two, with the two slots being diametrically opposite one another) extending from the PCB end 24a of the lens holder and extending longitudinally along the lens holder. The slots 28 are configured to receive respective structural elements or radial protrusions 22a, such as tabs or wings, of the winged retainer 22 when the lens barrel and retainer are received in the lens holder. The cross dimensions of the wings and the slots are selected to allow for movement of the wings along the slots and across the slots and to allow for twisting or tilting of the tabs within the slots, so as to allow for adjustment in multiple degrees of freedom during the focus and alignment of the lens relative to the imager.

As shown in FIGS. 2 and 3, the lens holder 24 is fastened or screwed to the imager PCB 18, and the slots 28 extend from the end or board side of the lens holder that abuts or opposes the front side of the imager PCB 18 (the side at which the imager 18a is disposed). In the illustrated embodiment, the slots 28 neck down to a pinch point at the end 28a opposite from the PCB end of the lens holder and the slots receive the wings 22a in the slots to assist in precisely positioning the lens barrel at the lens holder during the assembly process, as discussed below. The lens holder may include threaded bosses or structure 24b for threadedly receiving the fasteners 26 therein, and the lens retainer 22 may include slots 22b to accommodate an inner portion of the threaded structure when the retainer is received within the passageway of the lens holder.

Figure 4:
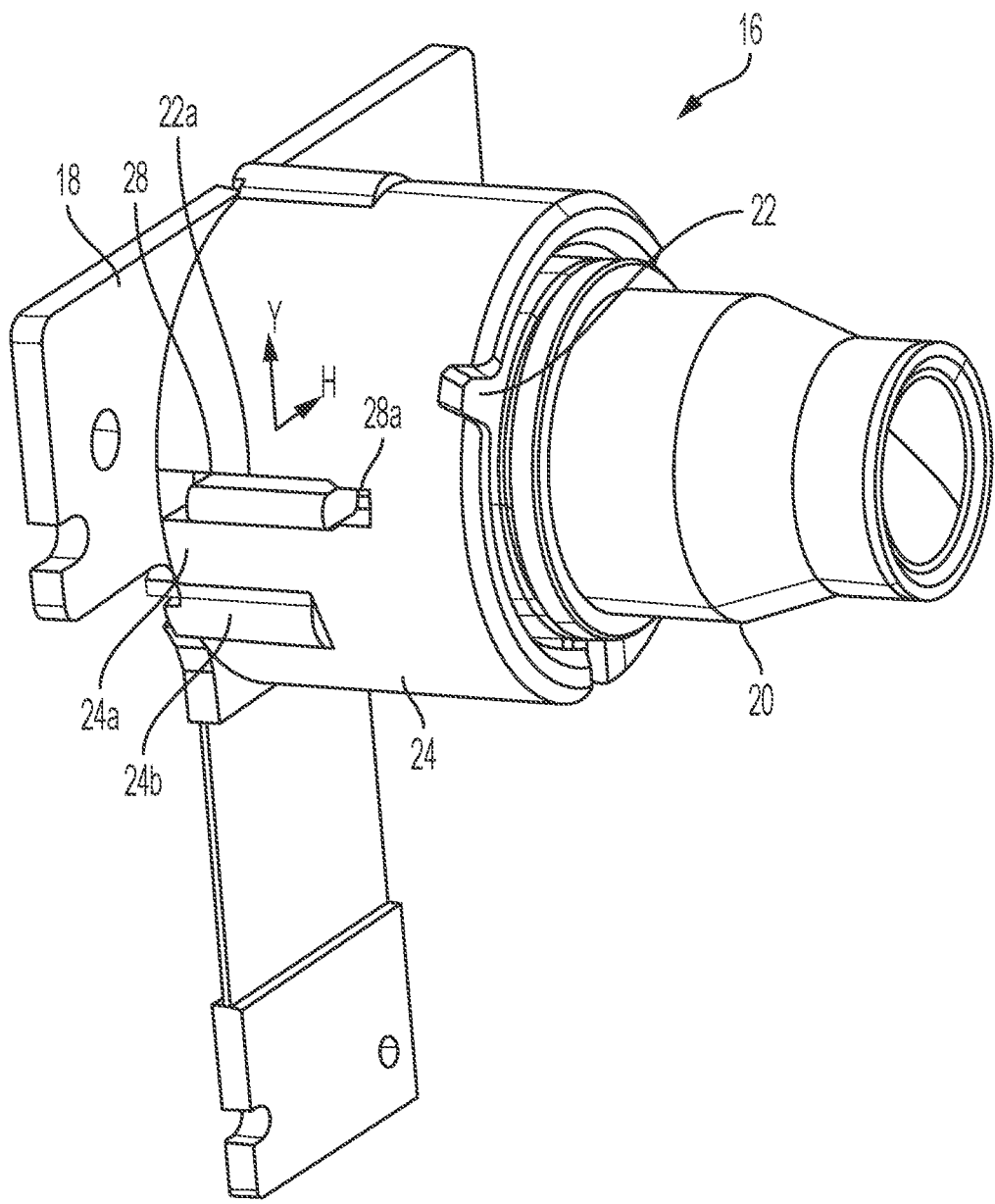
FIG. 4 is a perspective view of the part of the camera.
Figure 6:
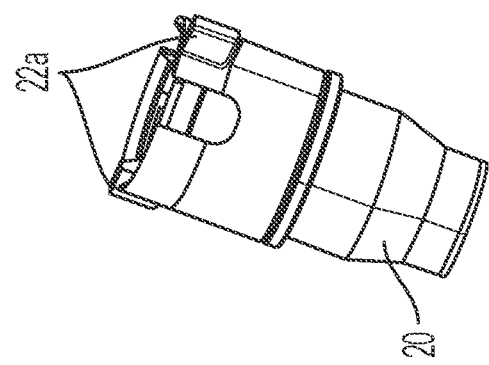
FIGS. 6 and 7 are perspective views of the lens-retainer subassembly comprising the lens and winged retainer.
Figure 5:
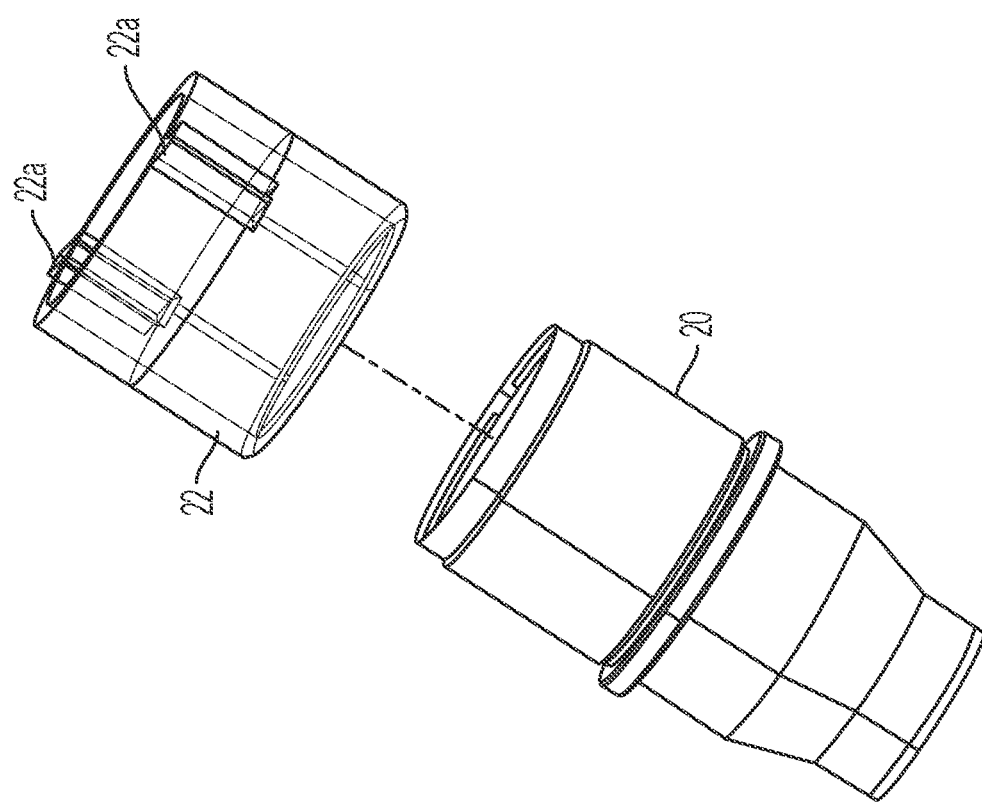
FIG. 5 is an exploded perspective view of the lens and winged lens retainer.

The lens barrel and lens retainer construction has tabs or wings 22a protruding radially outwardly at the board end of the retainer 22, where the board end of the retainer is the end of the retainer nearest the side of the PCB at which the imager is disposed. The lens barrel 20 is attached to the winged retainer 22 (or optionally the wings or tabs 22a may be part of the lens barrel itself) so that the lens barrel has at least one tab or wing 22a (and preferably at least two tabs or wings with the two tabs or wings being located diametrically opposite one another at the retainer). As shown in FIGS. 4 and 5, the lens barrel 20 may be threaded or slip fit or press fit into the retainer or lens weld housing 22 to form a lens-wing assembly, with adhesive optionally used to lock the lens barrel 20 and retainer 22 together. Optionally, the lens barrel may have the wings or protrusions formed as part of the lens barrel structure so that the lens-wing assembly is a single part instead of two separate parts joined together.

Figure 7:
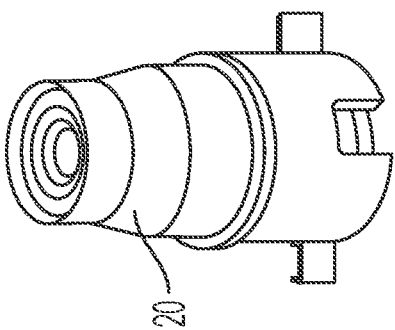
Figure 9:
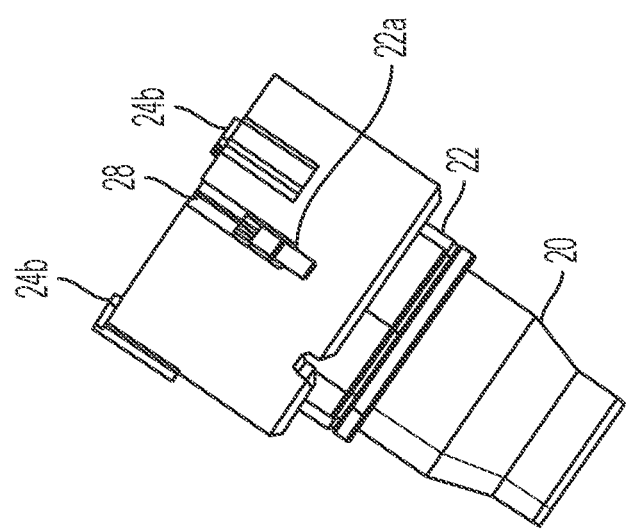
FIG. 9 is a perspective view of the lens-lens holder subassembly comprising the lens, the winged retainer, and the lens holder.

During assembly of the imager assembly, the lens barrel 20 is received in and secured at the winged retainer 22 so that the base or board end of the lens barrel-retainer construction has the wings 22a protruding radially outward therefrom. As shown in FIGS. 7-9, the lens-wing assembly is then inserted into the lens holder 24 (from the board end of the lens holder), with the wings 22a received in the slots 28 of the lens holder to form a lens and lens holder subassembly, which is placed for pickup by an assembly device or robot. When the subassembly is held with the lens pointing generally downward (as shown in FIGS. 8 and 9), the wings 22a move down the slots 28 and are received in the necked down or narrowed locating slots 28a to more precisely locate the lens relative to the lens holder and relative to the PCB (after the lens holder is attached to the PCB).

Figure 10:
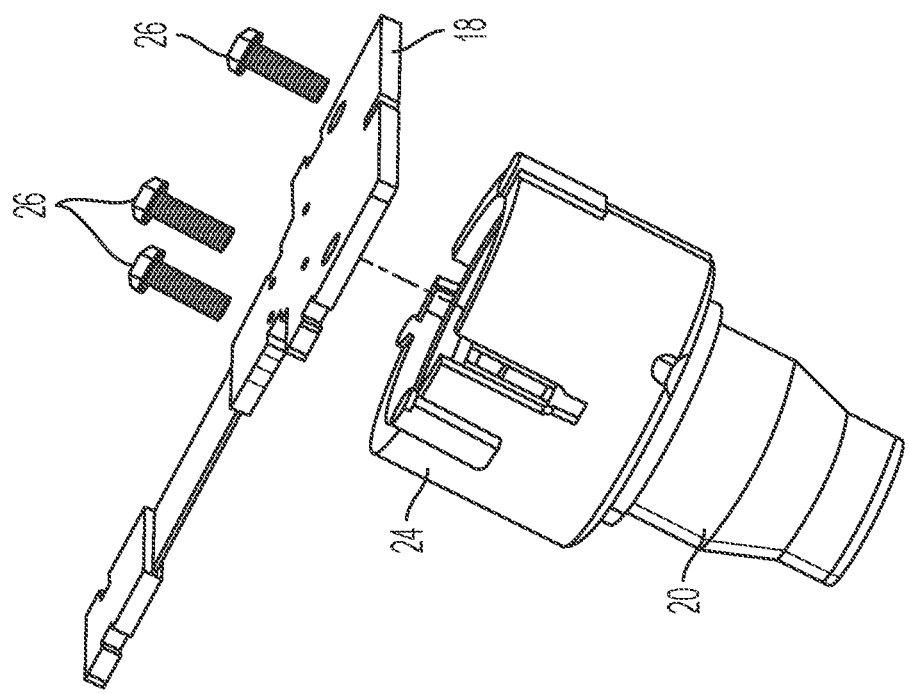
FIG. 10 is an exploded perspective view of the lens-lens holder subassembly, PCB, and fasteners.
Figure 12:
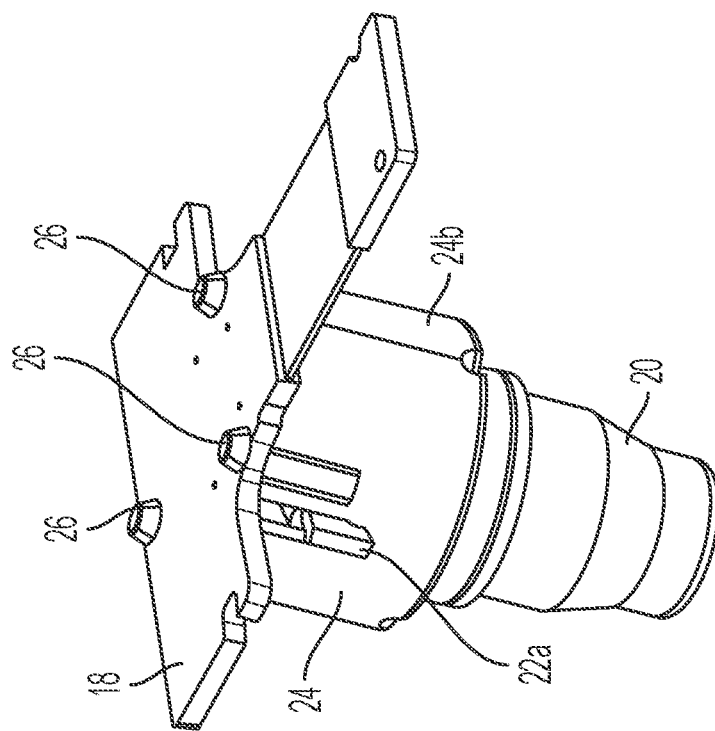
FIGS. 11 and 12 are perspective views of the lens-lens holder-PCB assembly, with the lens located at the locating slot.
Figure 11:
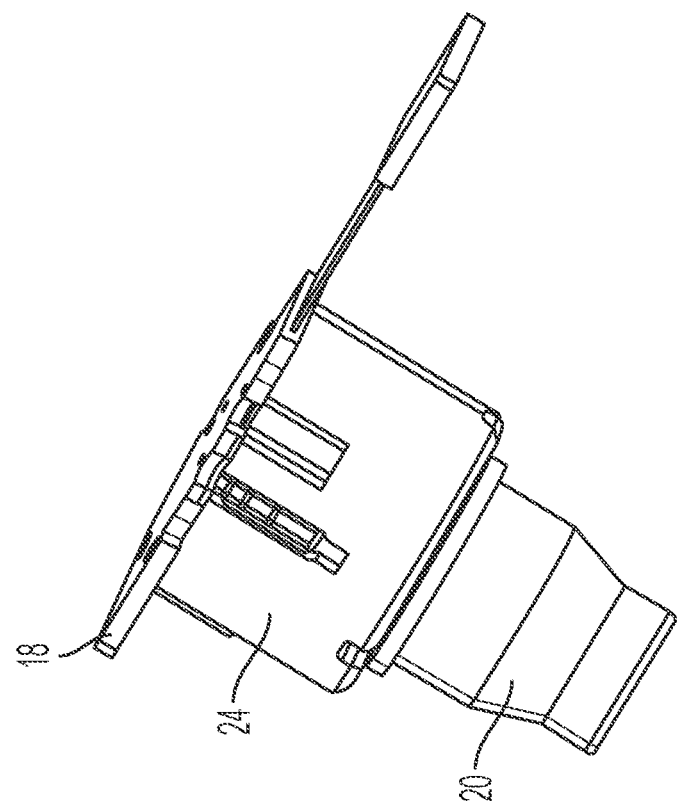

As shown in FIGS. 10-12, the lens and lens holder subassembly is attached at the PCB 18 via the plurality of fasteners or screws threading into the lens holder 24 (or via other attachment means, such as adhesive or the like) to form a PCB/lens assembly. The PCB/lens assembly is then ready for the focus/align equipment. The PCB/lens assembly is captured in the lens holder or housing and will be used for lens delivery.

The lens-lens holder subassembly is thus positioned at the imager PCB 18 and the lens holder 24 is fastened or screwed onto the imager PCB 18 via the fasteners 26. At this point, the tabs or wings 22a are movable within the slots 28 and the lens barrel 20 is thus movable radially and axially relative to the lens holder 24, as permitted by the clearance between the wings 22a and the slots 28.

Figure 14:
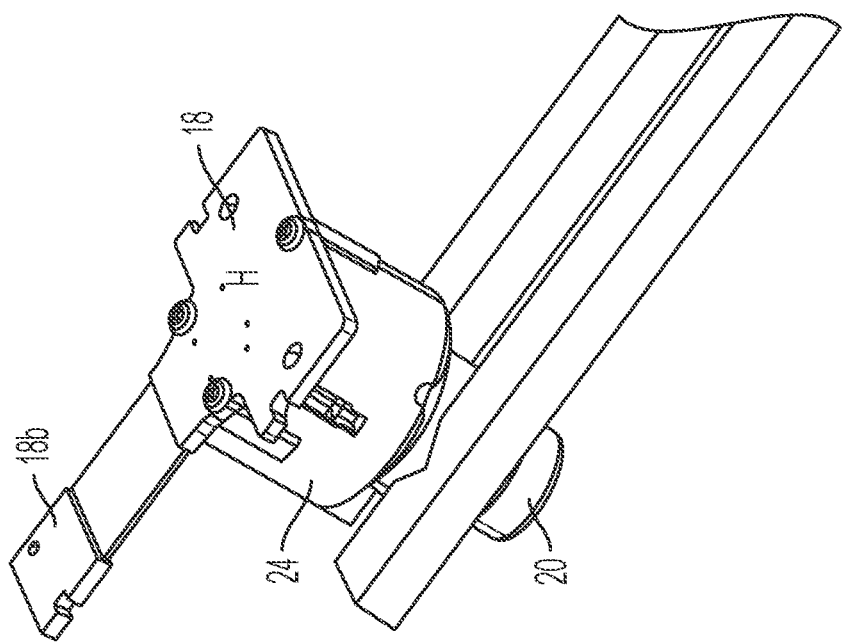
FIGS. 13 and 14 are perspective views showing the focus/align grippers before and after grasping the lens barrel while the PCB is fixtured for picking of the assembly for focus/alignment of the lens relative to the imager.
Figure 13:
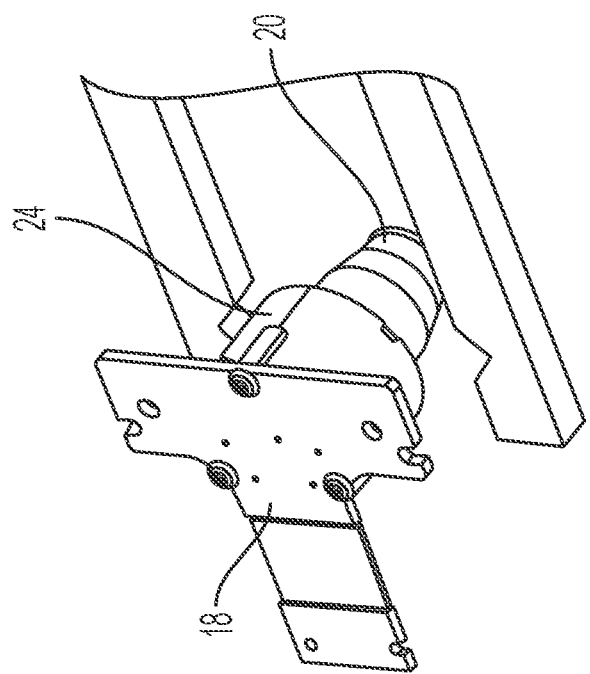

When the subassembly is positioned for pickup (see FIG. 13) and is waiting to be picked, the PCB 18 is fixtured or held and the wings 22a slide fully into the slots 28 to the necked-down pinch point region of the slots such that the lens barrel is held at that location relative to the lens holder (optionally, the end of the tab or wing 22a is similarly necked down or tapered to be snugly received at the necked down pinch point region of the slot). This makes it easier for the robot to pick the subassembly due to the precise location of the lens at the lens holder. As shown in FIGS. 13 and 14, the focus/align equipment grippers are open as the grippers approach the subassembly and, once positioned, the grippers close to grasp the lens barrel (with the lens wings located in the locating slots due to gravity and thus precisely positioned relative to the fixtured PCB) to secure the lens assembly before moving the assembly to the focus step and focusing and aligning the lens relative to the imager.

Figure 16:
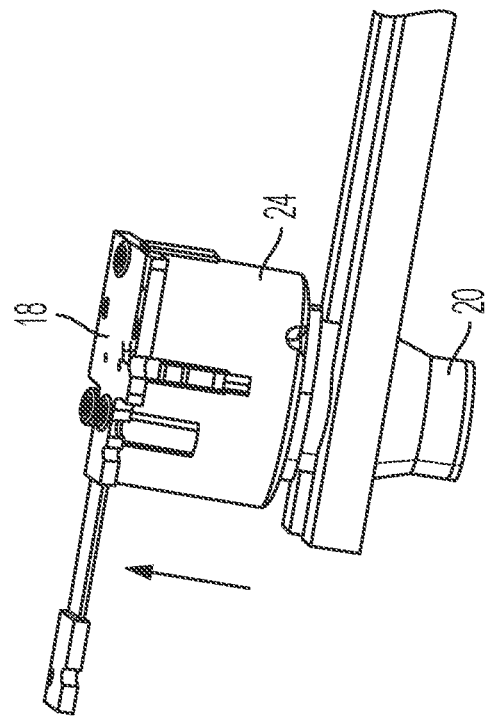
FIGS. 15 and 16 are perspective views of the assembly as grasped by the focus/align grippers for moving the assembly to focus.
Figure 15:
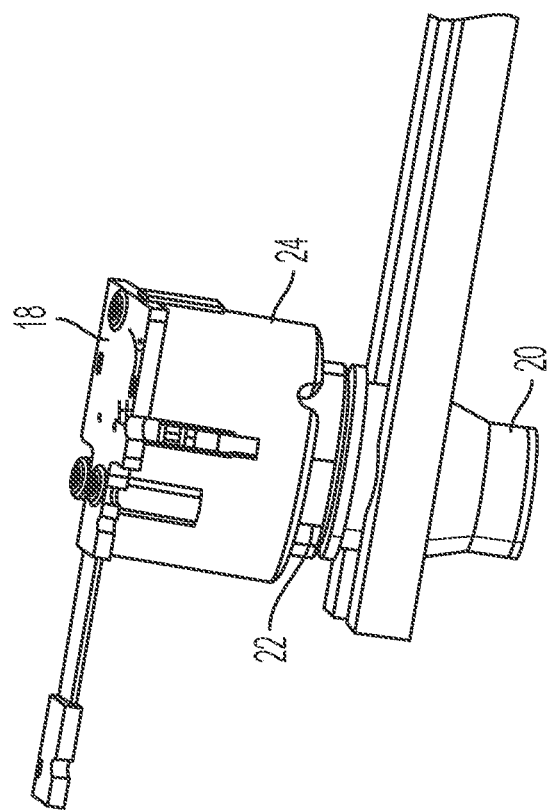

By positioning the lens with the wings in the locating slots of the lens holder (see FIG. 15), the system or process may decrease the cycle time and may obviate some equipment. Typically, a lens is handed off to the grippers with other equipment, and the equipment clears tooling, moves the assembly to the focus position and focuses and aligns the lens relative to the imager. Each of these steps takes cycle time to achieve the required movements. By having the lens assembly in the focus/align position when the tool grasps the lens barrel, the lens assembly can be more precisely grasped and moved to focus, whereby the lens barrel is moved toward the PCB (toward the focus range) by simply raising the lens to move the wings out of the locating slots and into the wider part of the slots (FIG. 16), with the travel distance optimized to decrease travel distance and reduce cycle time.

Figure 17:
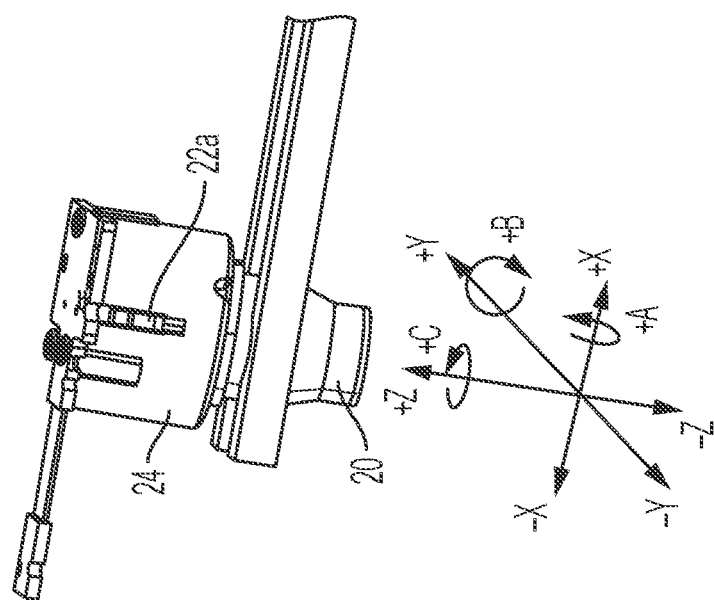
FIG. 17 is a perspective view of the assembly and grippers, showing the 6 axis focus and alignment of the lens relative to the imager.
Figure 19:
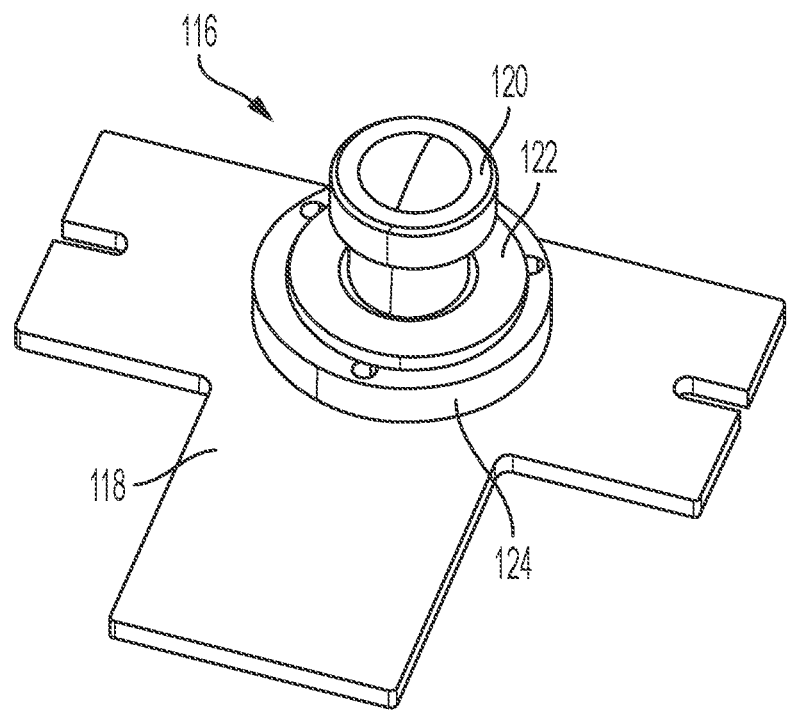
FIG. 19 is a perspective view of an imager assembly with the lens barrel received in a lens washer that is attachable at a PCB washer or holder at the imager PCB.

Because the lens is self-contained (as part of the lens holder and PCB assembly), no additional equipment is needed, and the process steps are also reduced during assembly of the imager assembly. When the lens is in the focus/align position (with the wings in the wider portions of the slots), the system may provide six axis focus and alignment of the lens relative to the imager (see FIG. 17).

Figure 18:
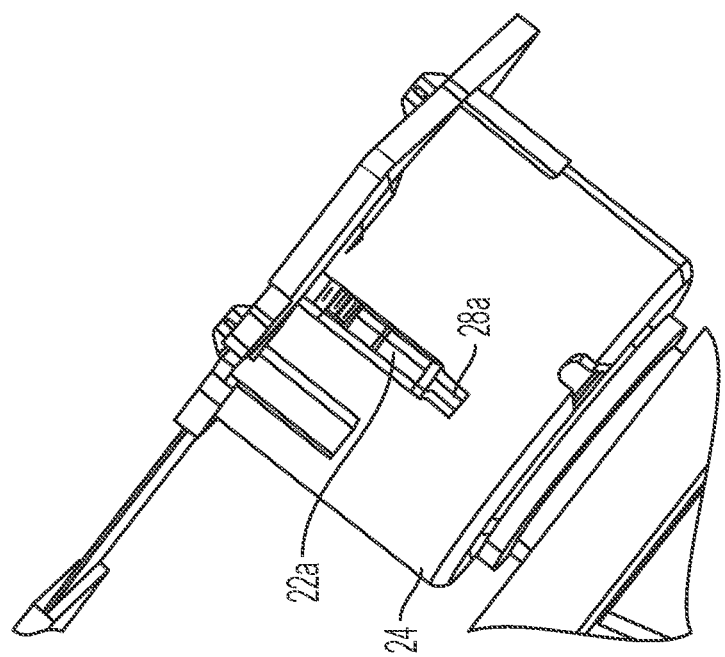
FIG. 18 is a perspective view showing the wings or structure within the slot for welding the lens barrel relative to the lens holder when the lens is focused and aligned relative to the imager.

When the lens is focused and aligned relative to the imager, the wings are laser welded in two or more locations at the lens holder (see FIG. 18). Thus, the lens may be adjusted relative to the lens holder to any suitable position (as enabled and limited by the range of motion of the wings within the slots of the lens holder) to bring the imager into focus and optical alignment with the lens, at which point the wings may be laser welded to the lens holder to secure the winged retainer (and therefore lens barrel) relative to the lens holder and PCB and therefore secure the lens relative to the imager. For example, the weld area (i.e., the location in the slots where the wings are laser welded following the focus/align process) may be in the wider portion of the slot above the locating slot 28a. The wings need not directly abut a side of their respective slots as the laser welding process may accommodate a gap between the wing and the side of the slot (such as about 0.2 mm).

The assembly process or system includes at least one camera or imager or sensor that views the slots and wings to determine the location of the wings within the slots. The system adjusts the lens barrel/retainer to position the wings so they are centered within the slots (i.e., so they can move radially in either direction within the slots). The imager or sensor or camera views the gaps between the wing and the walls of the slot and the lens is rotated to center the wings within the slots. This is done to minimize gaps between the wings and the lens holder and to center the wing within the slot.

The system then focuses and aligns (such as via a five axis adjustment or a six axis adjustment) the lens relative to the imager. During the focusing and aligning of the lens at the imager, the tab or wing can move toward or away from the imager PCB and can be rotated and can be tilted due to the clearances between the wings and the sides of the slots (because the wings start centered in the slots).

When the lens has been properly focused and aligned relative to the imager, a laser welding device melts or welds the wings at the slots to melt the wings at the walls of the slots of the lens holder to secure the lens relative to the lens holder and relative to the imager. The laser welding process is secure and avoids issues with adhesives, and no secondary curing is required. Laser welding may fill a gap (such as about 0.2 mm) between the components. The laser welding process may utilize any suitable laser welding device, such as, for example, a pulsed YAG (Yttrium-Aluminum Garnet) laser with an energy share option. This may allow for using a common laser source and share the output to two opposing heads.

The system or process thus uses a robot to actively focus and align the imager plane to the lens image plane, but instead of using a quick cure adhesive or other components, the image plane is set and secured by non-contact welding the components directly. The non-contact welding or laser welding or lasing occurs while the robot is holding the lens barrel and imager in optical alignment and focus. During welding, the material melts, flows, and solidifies, which may result in relative movement between the parts being welded. By having two tabs or radial protrusions disposed diametrically opposite one another, any such potential movements is balanced out by the two tabs and respective slots, so that alignment and focus of the lens relative to the imager is maintained during the welding process. The assembly process eliminates use of an expensive quick cure adhesive, and eliminates expensive UV and secondary curing. The system and process may also decrease assembly tolerances by instantly setting the image plane and the lens plane with non-contact welding. The system and process may also provide enhanced or increased thermal transfer, decreased cycle time and a reduction in required capital.

The lens retainer and the lens holder may comprise any suitable material that allows for the relative adjustment and quick welding of the tabs at the slots. For example, both components may comprise a metallic material or both components may comprise a plastic or polymeric material. For example, both components may comprise aluminum, such as 1100, 6061 or 4047 grade aluminum or the like or alloys thereof. When the lens is optically aligned and focused relative to the imager, the gap between the wing and the lens holder (i.e., the gap that needs to be filled by the laser process) may be less than about 0.010 inches (250 micrometers) or thereabouts.

Optionally, the imager assembly or camera may provide for adjustment and focus and alignment of the lens relative to the imager via adjustment of a lens holder or washer relative to the imager PCB and adjustment of the lens barrel relative to the lens washer and welding of the lens barrel at the washer and welding of the washer at the PCB. For example, and such as shown in FIGS. 19-24, the imager assembly or camera 116 comprises an imager printed circuit board (PCB) 118 having an imager 118a disposed thereat (with the imager PCB optionally having a flexible electrical connector or flexible ribbon cable or the like extending therefrom for electrical connection to a processing printed circuit board of the camera). The imager assembly 116 also includes a lens barrel 120 that is adjustably disposed at a lens washer 122. The lens barrel 120 accommodates a lens or lens assembly (comprising a plurality of lens optics or elements) and has an inner end 120a, which is received in a passageway of the lens washer 122. The imager assembly 116 also includes a lens holder or PCB washer 124 that is fastened to the imager PCB 118, such as via a plurality of fasteners or screws.

The lens barrel is adjustably disposed at the lens washer 122, and the lens washer 122 is adjustably disposed at the PCB washer 124. With the lens barrel and lens washer adjusted to optically align the lens with the imager, the lens barrel is welded to the lens washer and the lens washer is welded to the PCB washer.

Figure 20:
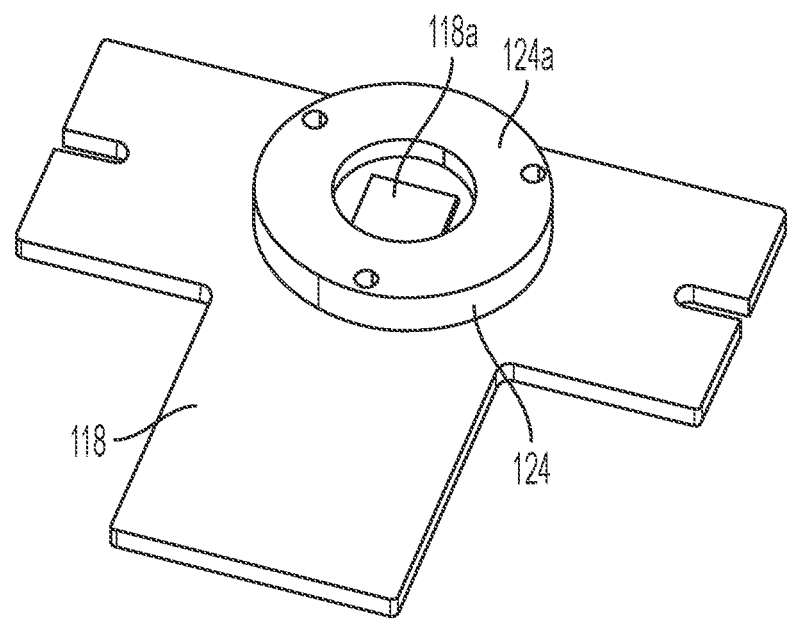
FIG. 20 is a perspective view of the imager PCB with the PCB washer affixed thereat.

As shown in FIG. 20, the PCB washer 124 is fixedly attached at the imager PCB 118 via fasteners. Although shown as a disc-shaped washer that circumscribes the imager, the annular interface surface of the PCB washer may comprise an outer surface or portion of a housing or lens holder that houses or accommodates the imager PCB.

Figure 23:
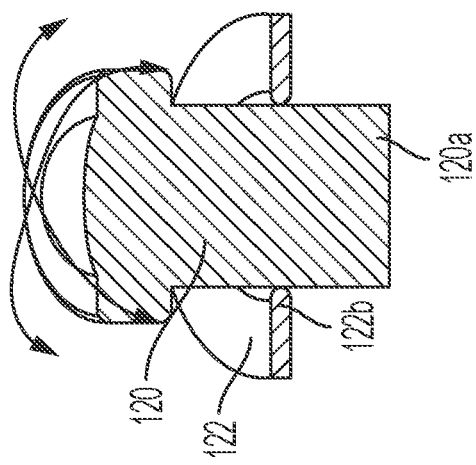
FIGS. 22 and 23 are perspective views of the lens barrel adjustably positioned at the lens washer.
Figure 22:
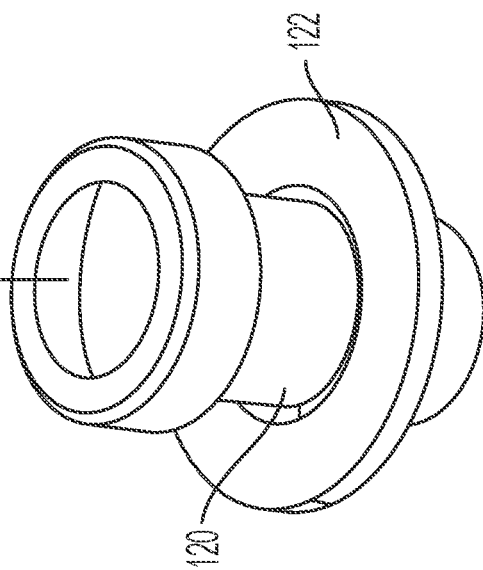
Figure 21:
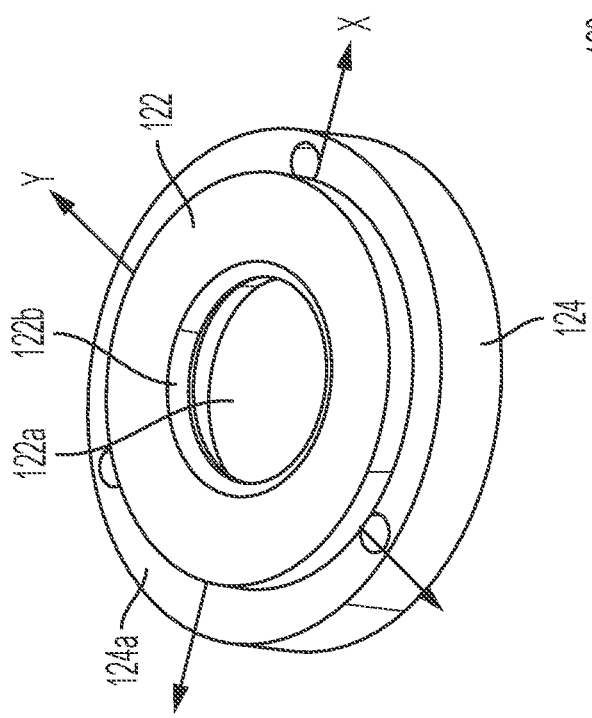
FIG. 21 is a perspective view of the PCB washer with the lens washer adjustably positioned thereat.
Figure 24:
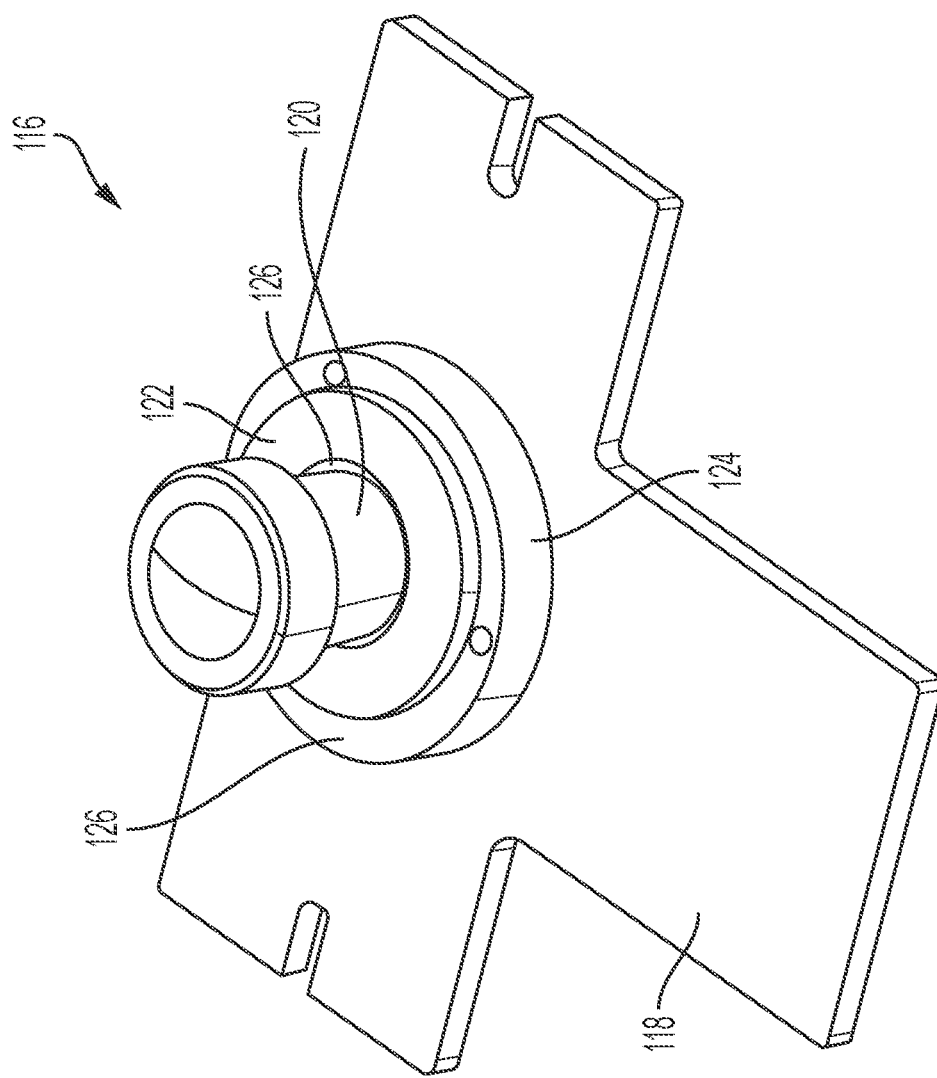
FIG. 24 is a perspective view of the imager assembly, showing the weld lines that secure the lens barrel relative to the lens washer and the lens washer relative to the PCB washer.
Figure 26:
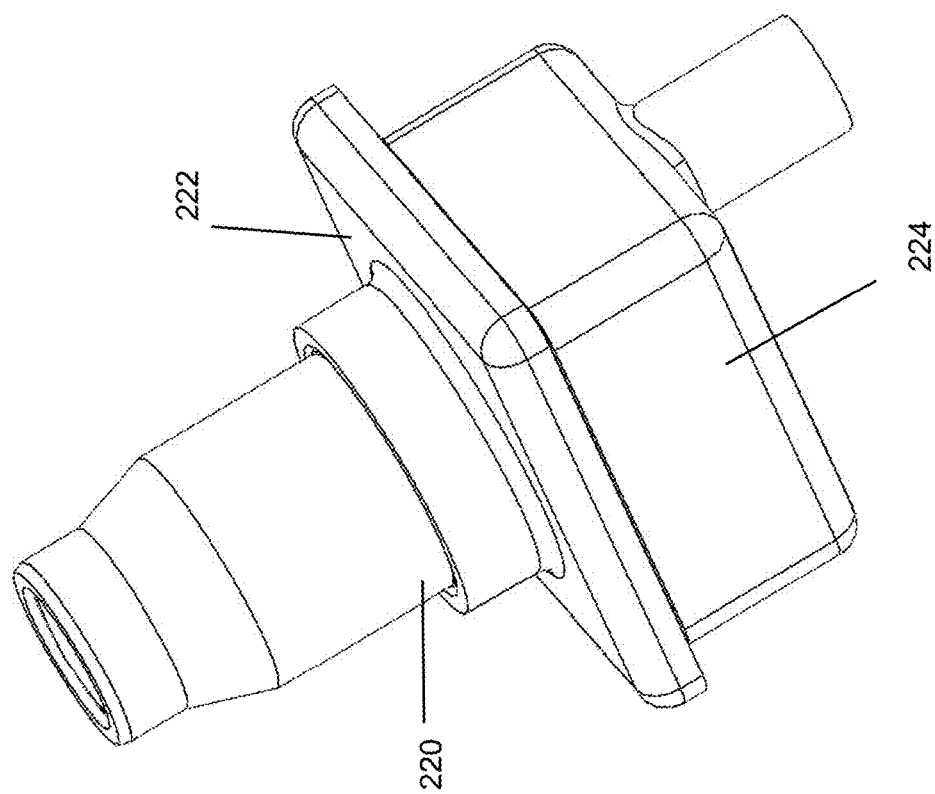
FIG. 26 is a perspective view of the camera assembly of FIG. 25 without the weld washer.
Figure 25:
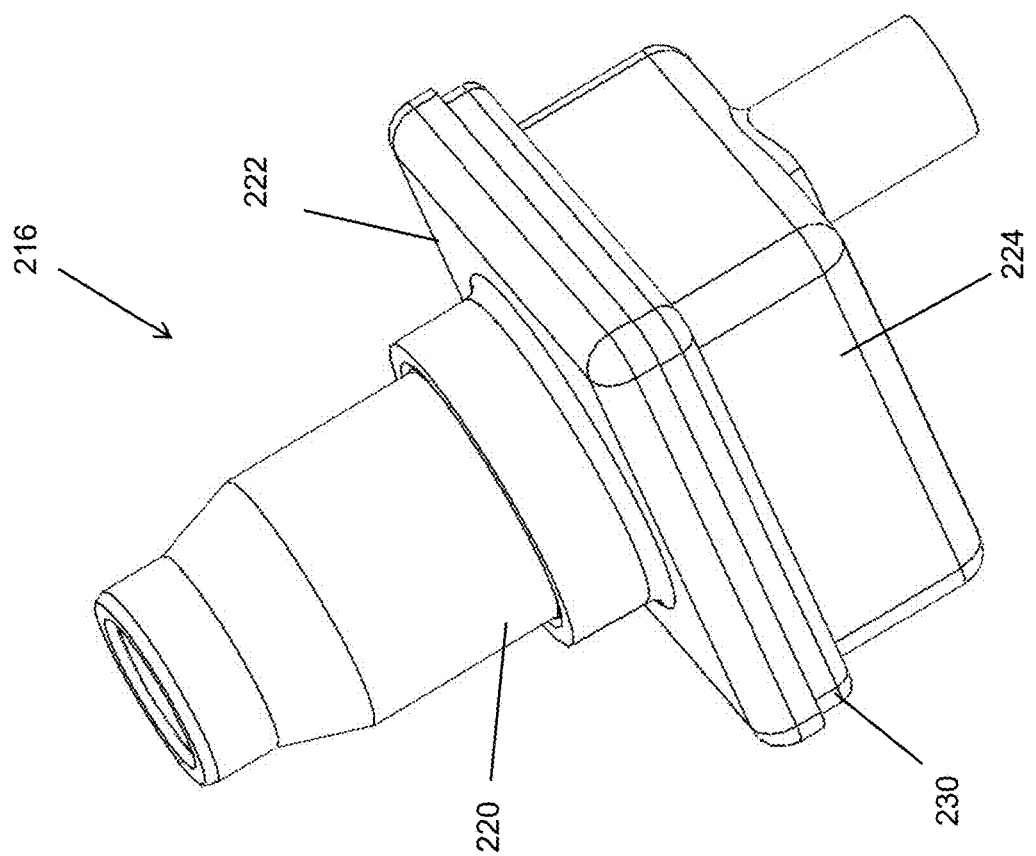
FIG. 25 is a perspective view of another embodiment of a camera assembly with a weld washer.
Figure 27:
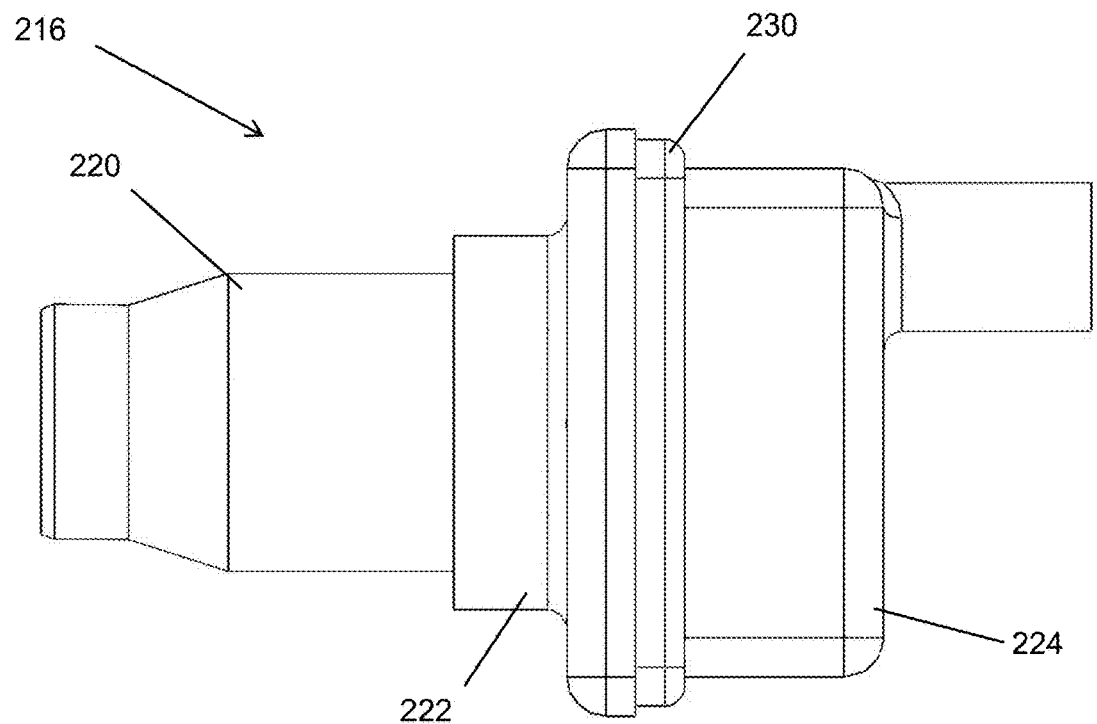
FIG. 27 is a side view of the camera assembly of FIG. 25 with the weld washer.
Figure 28:
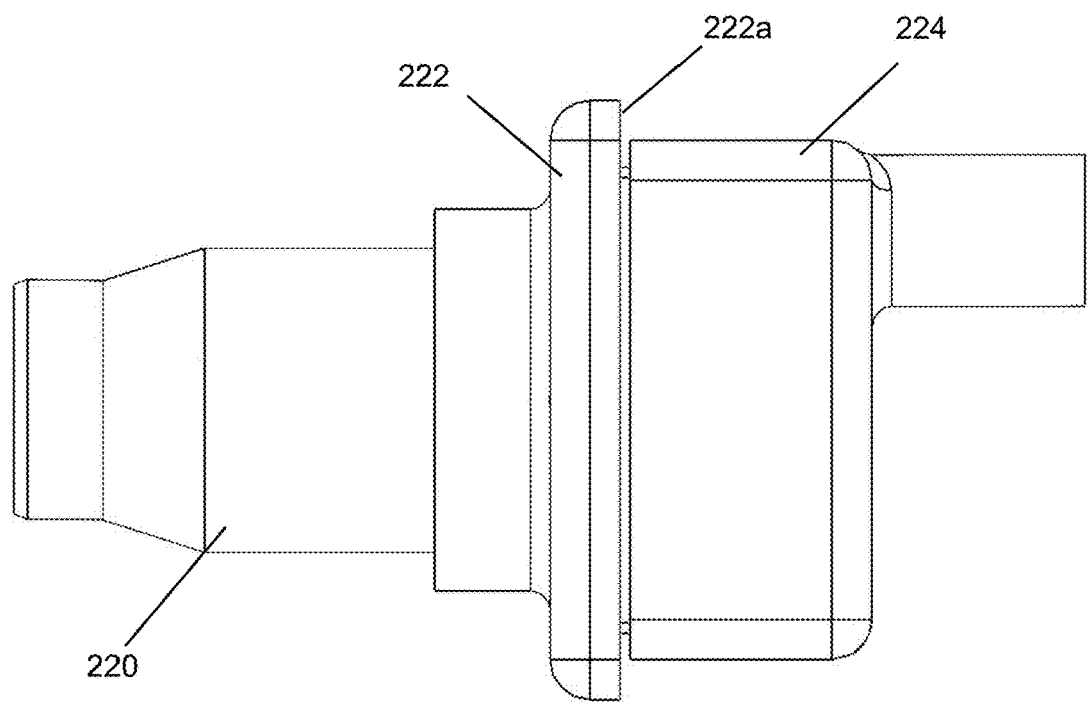
FIG. 28 is a side view of the camera assembly of FIG. 25 without the weld washer.
Figure 29:
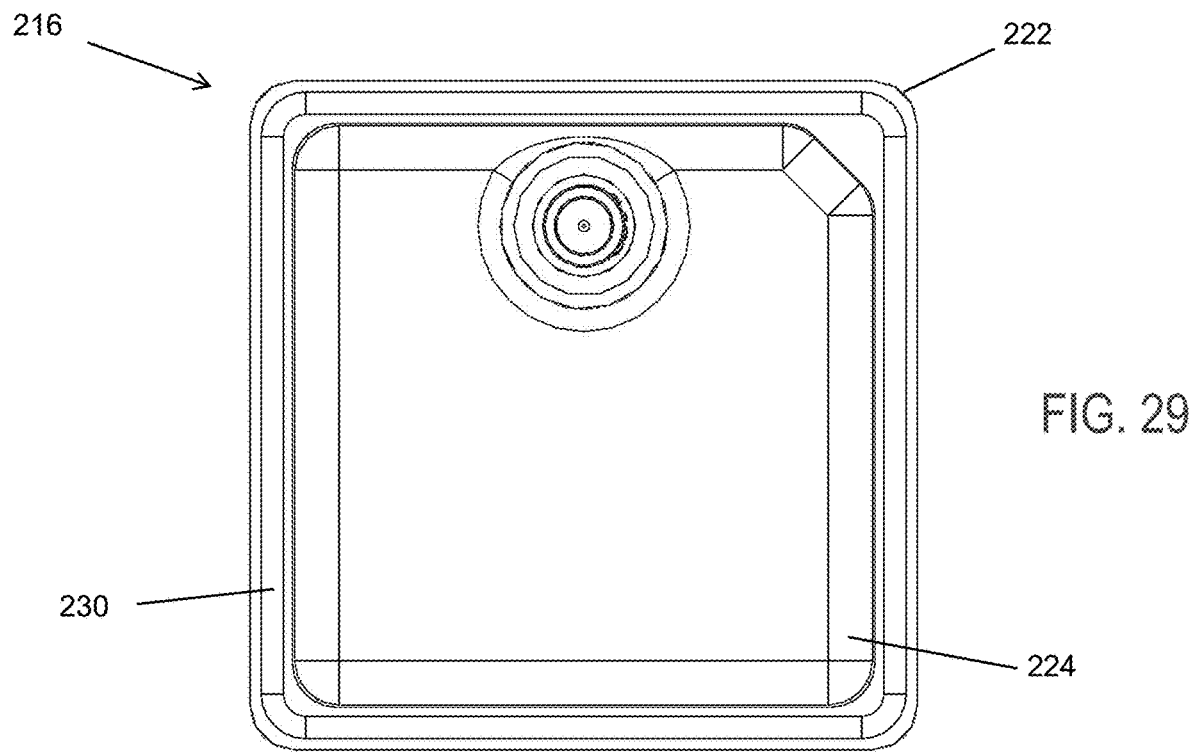
FIG. 29 is a rear view of the camera assembly of FIG. 25 with the weld washer.
Figure 30:
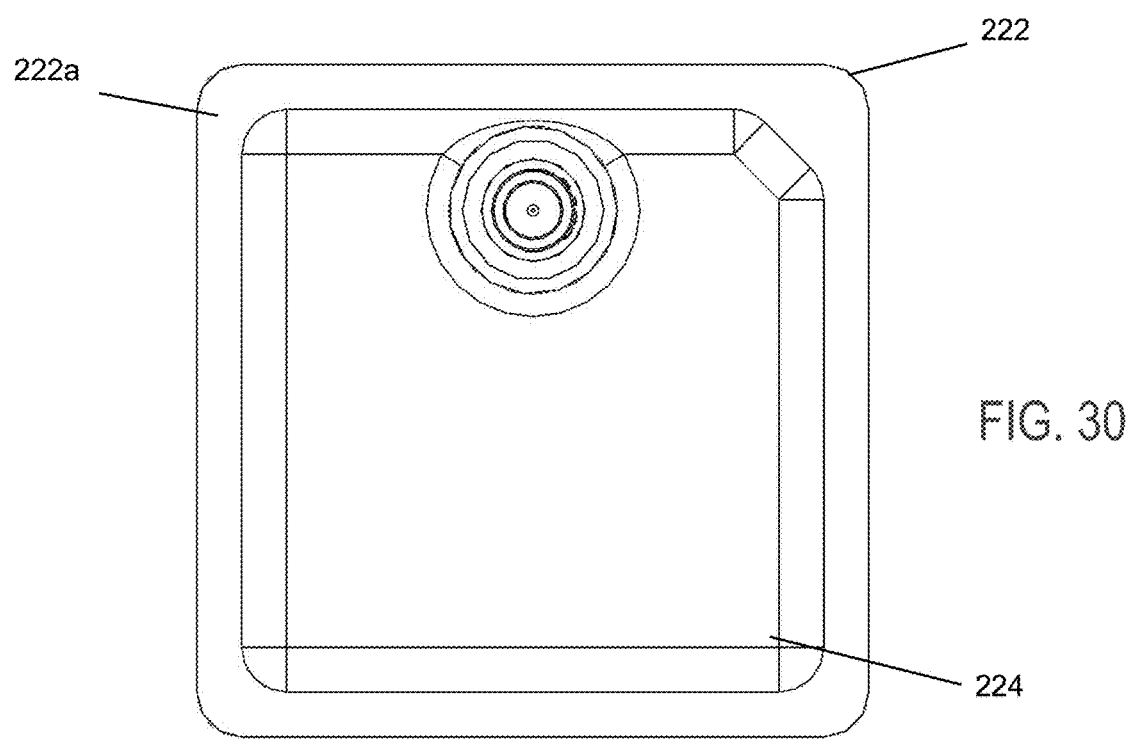
FIG. 30 is a rear view of the camera assembly of FIG. 25 without the weld washer.

As shown in FIG. 21, the lens washer 122 is adjustably positioned at the PCB washer 124 and is adjustable in the x-y directions (the x-axis and the y-axis are parallel to the imaging plane of the imager, with the z-axis being perpendicular to the imaging plane and parallel to or coaxial with the longitudinal axis of the lens barrel) by an annular interface surface of the lens washer interfacing with and sliding or moving at an outer annular interface surface 124a of the PCB washer 124. As shown in FIGS. 22 and 23, a cylindrical portion of the lens barrel 120 is received in the lens washer 122 (through a central cylindrical passageway 122a through the lens washer) and is adjustable in the z-direction (FIG. 22) relative to the lens washer. In the illustrated embodiment, and as best shown in FIG. 23, the lens washer 122 may have a radiused or rounded inner interface surface 122b that circumscribes the passageway 122a and that opposes or interfaces with the cylindrical interface surface of the lens barrel 120 to allow for plane adjustment of the lens barrel relative to the lens washer and imager by allowing the lens barrel to tilt relative to an axis normal to the lens washer. The radius of curvature of the interface surface 122b may be selected as half of the thickness dimension of the lens washer 122 (or other suitable dimension depending on the interface with the lens barrel or gap size between the interface surface 122b and the lens barrel). The diameter of the passageway 122a is selected to be slightly larger than the diameter of the cylindrical portion of the lens barrel to allow for movement of the lens barrel relative to the washer during focusing and optical aligning of the lens relative to the imager.

Thus, the lens washer is adjustably positioned at the PCB washer (which is affixed relative to the imager PCB) and the lens barrel is adjustably positioned at the lens washer. The lens washer and PCB washer interface allows for x-axis adjustment and y-axis adjustment of the lens barrel relative to the imager, while the lens barrel and lens washer interface allows for z-axis adjustment and for plane adjustment of the lens barrel relative to the imager. Thus, the lens washer is adjustably disposed at the lens holder to facilitate x-axis adjustment and y-axis adjustment of the lens washer relative to the lens holder, and the lens barrel is adjustably received through the lens washer to facilitate z-axis adjustment and plane adjustment of the lens barrel relative to the lens holder. With the lens washer disposed at the PCB washer and with the lens barrel disposed at the lens washer, the lens barrel is adjusted relative to the imager to optically align and focus the lens relative to the imager. With the desired optical alignment and focus obtained, the two interfaces (the interface of the lens barrel and the lens washer and the interface of the lens washer and the PCB washer) are welded (see weld lines 126 in FIG. 24) to secure the lens barrel relative to the imager.

The camera or imager assembly thus provides for adjustment and alignment of the lens barrel relative to the imager without use of adhesive or threading of the lens barrel at a lens holder. The lens barrel is welded at the imager PCB via laser welding or other non-contact welding. Optionally, the lens barrel may be disposed in the lens washer and PCB washer and a retainer may be attached at the inner end of the lens barrel (e.g., a retaining nut may be threaded onto the bottom or inner end of the lens barrel) to retain the washers and lens barrel together as a unit or sub-assembly. The sub-assembly may then be provided at the imager PCB, whereby the retainer may be removed. This allows for manufacturing of the imager assembly without having to separately provide the lens barrel and lens.

Figure 31:
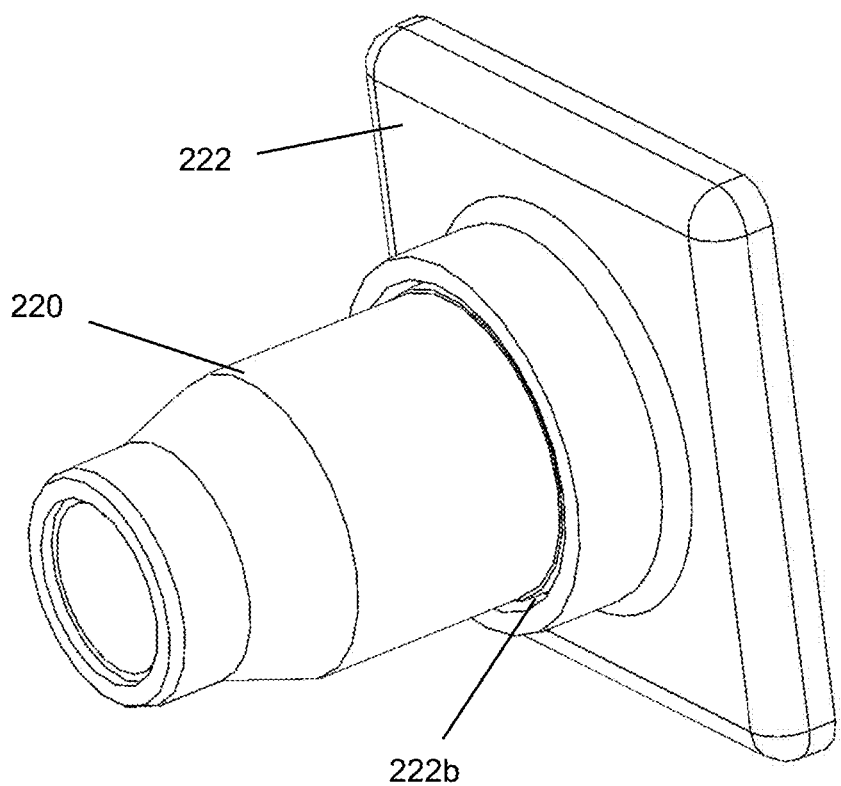
FIGS. 31 and 32 are perspective views of the lens holder subassembly.
Figure 32:
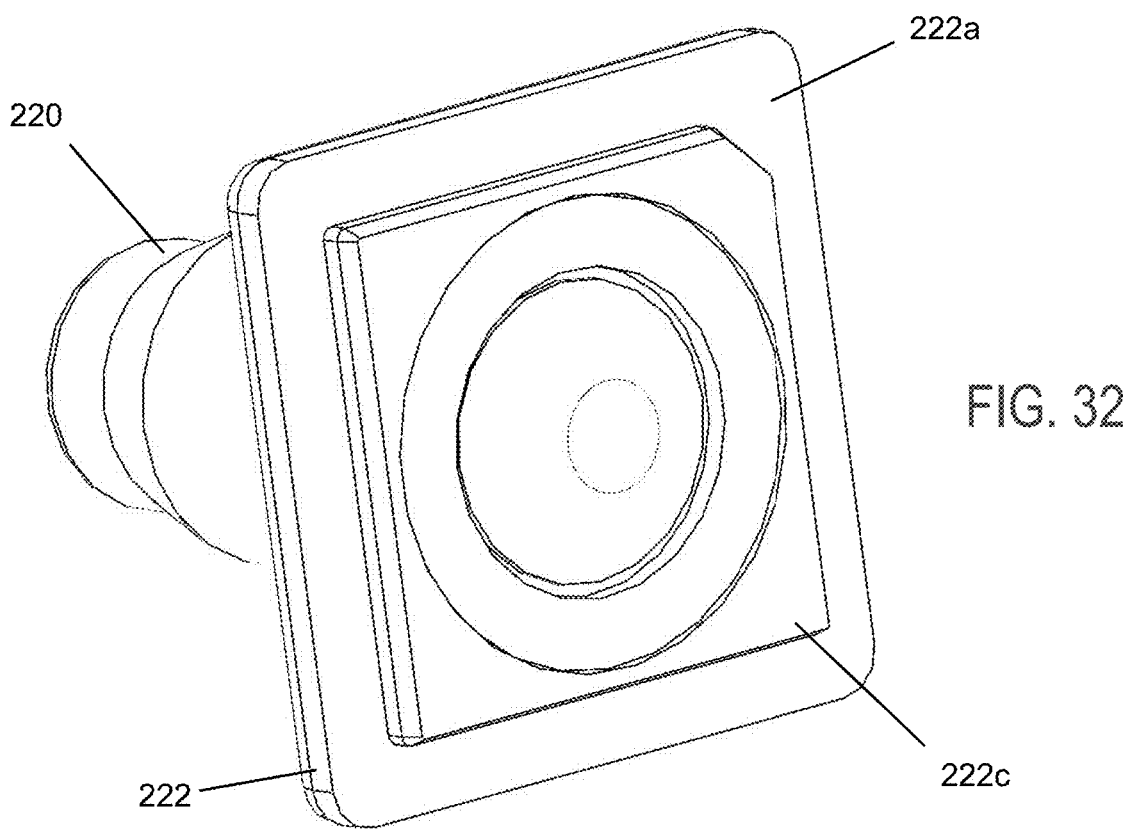
Figure 33:
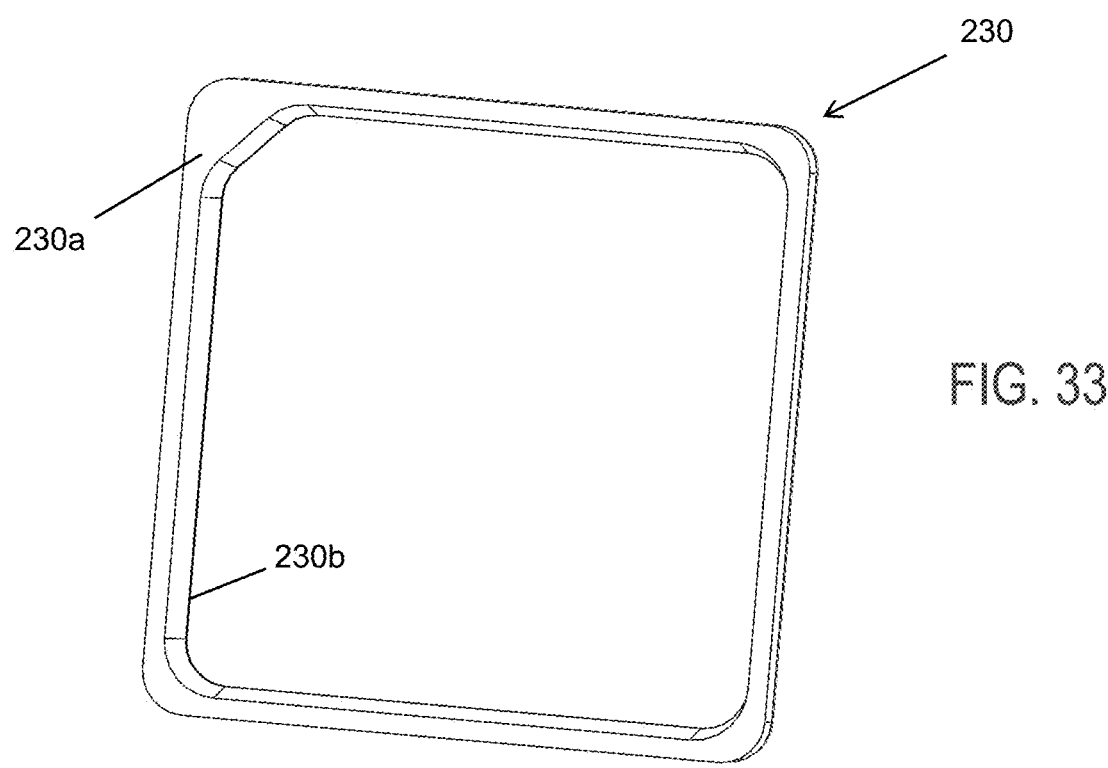
FIGS. 33 and 34 are perspective views of the weld washer.
Figure 34:
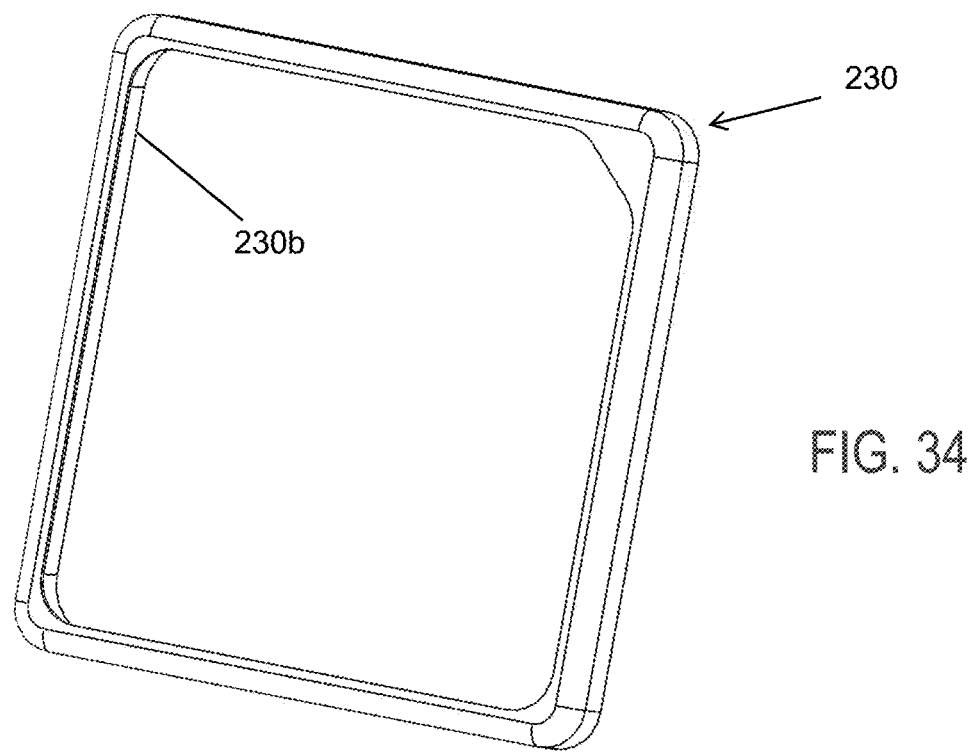
Figure 35:
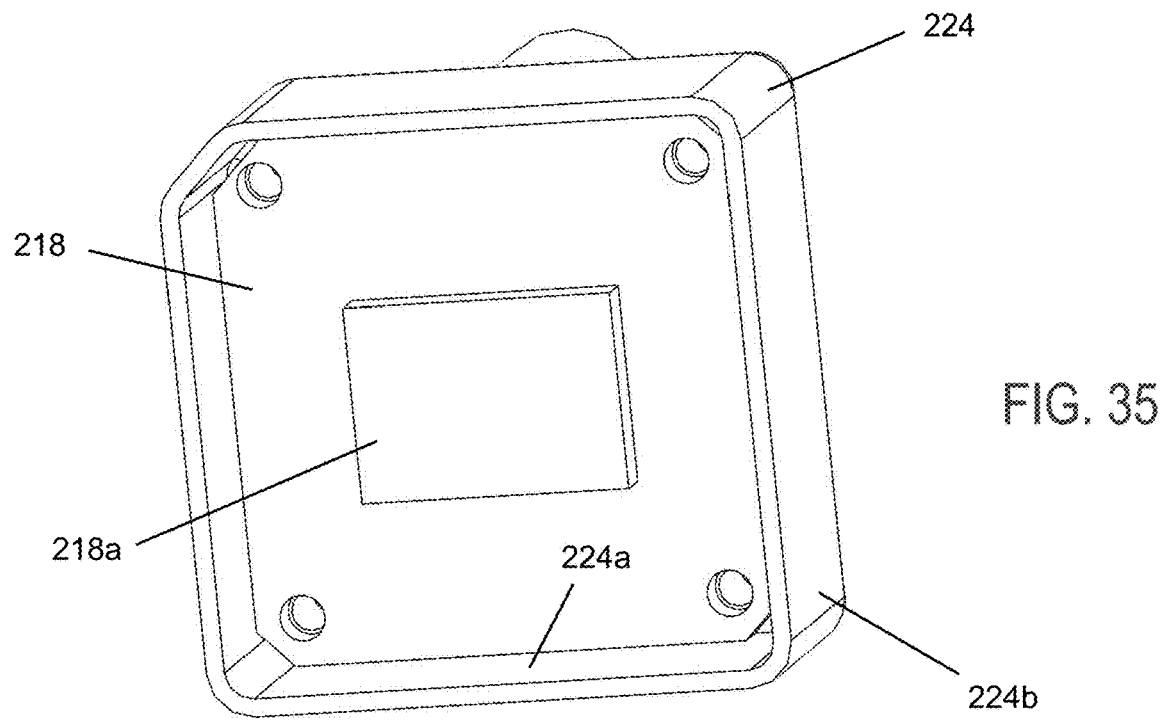
FIG. 35 is a perspective view of the rear housing and imager PCB subassembly.
Figure 36:
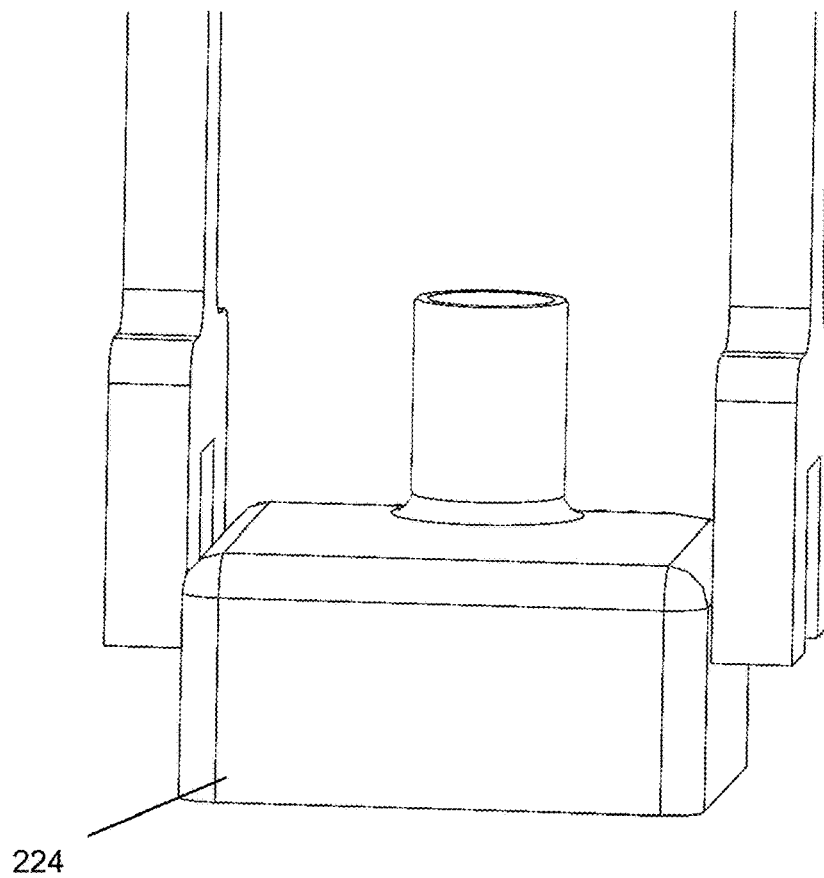
FIG. 36 is a perspective view of the rear housing as grasped by the grippers.
Figure 38:
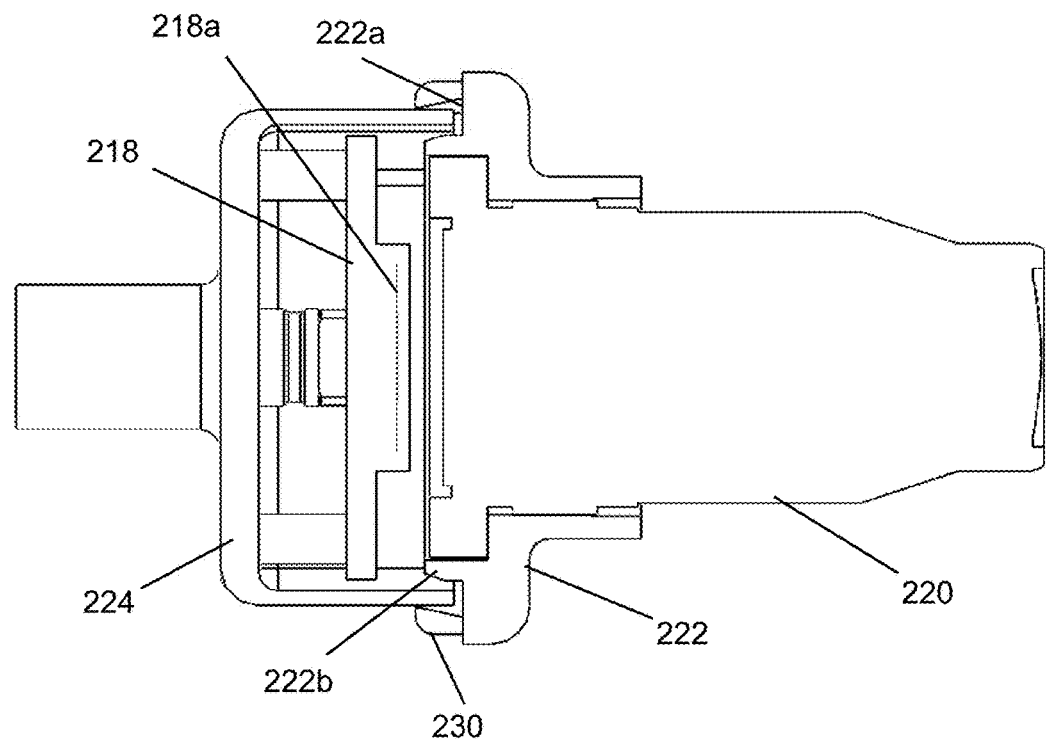
FIG. 38 is a cross sectional view of the camera assembly of FIG. 25.
Figure 37:
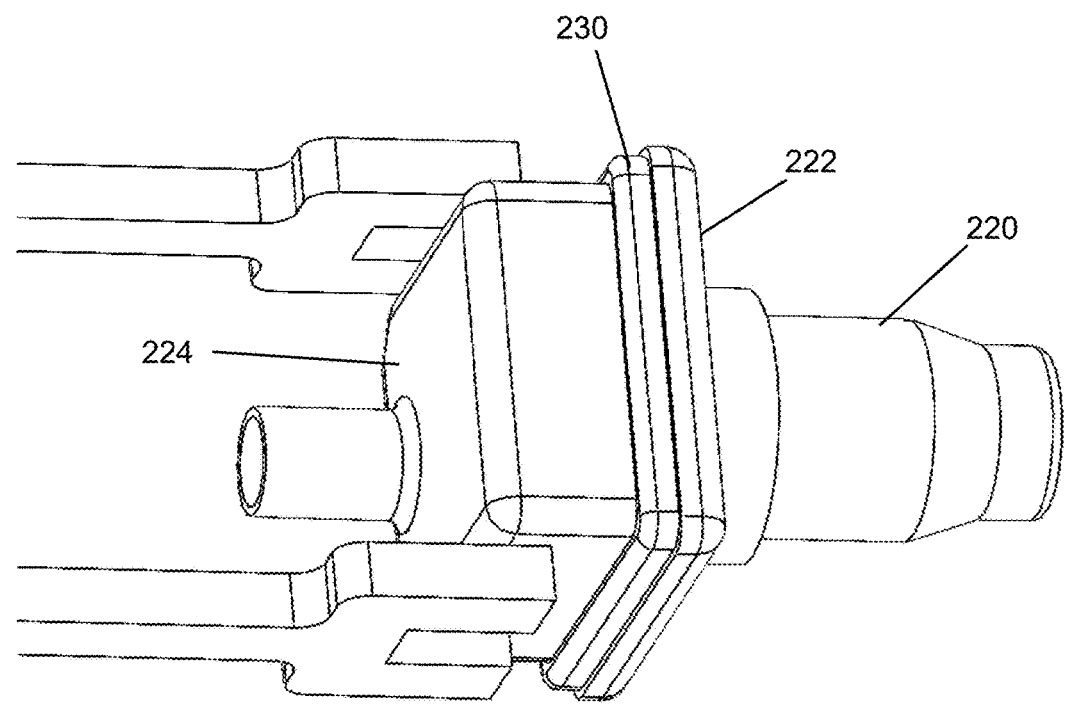
FIG. 37 is a perspective view of the camera assembly, with the rear housing grasped and adjusted by the grippers to optically align the imager disposed at the rear housing with the lens of the lens holder subassembly.

Optionally, the imager may be attached at a rear housing of the camera and the rear housing may be adjusted relative to the lens holder and lens assembly to align/focus the lens relative to the imager, whereby the rear housing may be secured relative to the lens holder, such as via a weld washer disposed at the rear housing-lens holder interface. For example, and such as shown in FIGS. 25-38, a camera assembly 216 may include a lens barrel 220, a lens holder or front housing 222, a rear housing 224, and a weld washer 230. The imager 218a is disposed at an imager PCB 218 that is fixedly attached (such as via adhesive or screws or other fasteners) to the rear housing 224 (FIG. 35) (such as to an interior surface of a rear wall of the rear housing or to a structure fixedly disposed in or formed as part of the rear housing) and the imager 218a is focused and aligned with the lens of the lens barrel and lens holder subassembly (FIGS. 31 and 32) via adjustment of the rear housing 224 (and imager PCB) relative to the front housing 222 and lens, with the front and rear housings fixed to one another after alignment via laser welding of the weld washer 230 (FIGS. 33 and 34) to the front and rear housings. This process actively aligns the imager of the PCB to the lens, which allows for control of image rotation during active alignment. This process also makes the active alignment laser welding process the final sealing process needed in manufacturing the camera assembly. Otherwise, a typical manufacturing process may require a screw, cover, and gasket station or a separate rear cover laser weld station after alignment.

The front housing 222 includes a rear or washer-interface surface 222a configured to receive and be laser welded to the weld washer 230 and the front housing also includes an aperture 222b through which the lens barrel 220 is received. Together, the lens barrel 220 and front housing 222 comprise the lens holder subassembly. The rear surface 222a of the front housing may include a raised portion or ridge 222c (FIG. 32) corresponding to a shape of an inner side surface 224a of the rear housing 224 to help guide alignment of the rear housing and imager 218a at the front housing. Adjustment of the rear housing and imager is relative to a lens principal point or pivot point (the point where the lens axis intersects the principal plane of the lens and the point about which the lens or imager is rotated relative to the other during active focus and alignment). The imager is disposed at a PCB which is attached at an interior surface of the rear housing (such as a back wall of the rear housing) and may be electrically connected to a connector that is configured for electrical connection to a vehicle wire harness when the camera is installed at a vehicle. For example, at the rear side of the PCB, a flexible connector or connector header (or optionally a second PCB or connector PCB) may be electrically connected to the imager PCB and a connector portion 224c (such as a coaxial connector) of the housing for electrically connecting to a vehicle wire harness or coaxial cable when the camera is installed at the vehicle and for outputting image data signals to a system of the vehicle.

The weld washer 230, during assembly of the camera, slides along the outer surface of the rear housing and includes a flat surface 230a for interfacing with the rear surface 222a of the front housing. The shape of the inner surface 230b of the weld washer corresponds to a shape of an outer side surface 224b of the rear housing 224 to provide an additional alignment feature between the front housing, rear housing and weld washer.

During alignment, the lens barrel 220 (and therefore the lens) and lens retainer or front housing 222 remain stationary. The lens barrel may be fixedly attached to the front housing, such as via a threaded interface and/or adhesive. The rear housing 224 is moved into engagement with the front housing and adjusted by grippers (FIGS. 36 and 37) and the weld washer 230, after being disposed at the interface between the front and rear housings, "floats" across the rear surface 222a of the front housing 222. In other words, the lens holder subassembly is held stationary and the rear housing is moved relative to the lens holder and relative to a pivot point or principal point of the lens to optically align the imager 218a and the lens, while the weld washer is disposed at the rear surface of the front housing and around the outer surface of the rear housing.

Movement of the rear housing results in movement of the weld washer so that, when the rear housing is positioned such that the imager is in alignment with the lens, the weld washer is in the proper position to be laser welded to the front and rear housings. The interface of the weld washer 230 at the rear surface 222a of the front housing 222 allows for x, y, and theta-z adjustment of the imager relative to the pivot point while the weld washer remains flat against the rear surface 222a of the front housing 222. The interface of the weld washer 230 at the side surface 224b of the rear housing 224 allows for theta-x, theta-y, and z adjustment of the imager relative to the pivot point, while still maintaining a fillable weld gap between the weld washer and the front and rear housings.

Once the imager 218a is aligned with the lens of the lens barrel 220 via movement of the rear housing 224, the weld washer 230 is laser welded in place (such as to the rear surface 222a of the front housing and the side surface 224b of the rear housing) to maintain the positioning of the front and rear housings. The weld washer may be welded to both the front and rear housings during the same process and/or at the same time. Laser welding may fill a gap (such as about 0.2 mm) between the weld washer and the front and/or rear housings. Such a gap allows for sufficient adjustment of the imager relative to the pivot point while maintaining a suitable spatial relationship between the front and rear housings and the weld washer for laser welding the components together.

Thus, the vehicular camera may include (i) a lens barrel accommodating a lens and having an inner end, with the lens barrel having a cylindrical portion, (ii) a lens holder for receiving the inner end of the lens barrel, the lens barrel fixedly attached to the lens holder, (iii) an imager printed circuit board, with an imager is disposed at a first side of the imager printed circuit board, (iv) a rear housing configured to engage the lens holder, and (v) a weld washer. The imager printed circuit board is fixedly attached at the rear housing so that, with the rear housing engaging the lens holder, the first side of the imager printed circuit board faces the lens of the lens barrel. With the rear housing engaging the lens holder, the weld washer circumscribes the rear housing and is at the lens holder. With the rear housing positioned at the lens holder, the rear housing is movable relative to the lens holder to optically align and focus the lens at the imager. After the lens is optically aligned and focused relative to the imager, the weld washer is welded to the rear housing and is welded to the lens holder to secure the lens barrel relative to the imager printed circuit board.

In the illustrated embodiments, the imager assembly is part of a camera, where the imager assembly may be disposed at a housing portion and the flexible connector may be electrically connected to another circuit board of the camera (such as a processor circuit board having an image processor and other circuitry disposed thereat), such as by utilizing aspects of the windshield-mounted camera assemblies described in U.S. Pat. Nos. 9,896,039; 9,871,971 and/or 9,596,387, which are all hereby incorporated herein by reference in their entireties. Optionally, the imager assembly may be part of an exterior-mounted camera, where a rear housing may be mated with the lens holder after the imager printed circuit board is attached to the lens holder, such as by utilizing aspects of the windshield-mounted camera assemblies described in U.S. Pat. Nos. 10,272,857 and/or 10,264,219, which are hereby incorporated herein by reference in their entireties. The camera assembly includes an electrical connector portion that is configured to electrically connect to a vehicle wire harness when the camera is installed at a vehicle.

Although shown as having a single printed circuit board (having the imager at one side and circuitry and connecting elements (such as a header connector) at the other side), the camera assembly may include an imager printed circuit board and a separate connector printed circuit board, with the circuitry of the two printed circuit boards electrically connected. The printed circuit boards may be attached at the lens holder or to the rear camera housing, and/or may be attached to one another, such as by utilizing aspects of the cameras and processes described in U.S. Publication No. US-2020-0010024, which is hereby incorporated herein by reference in its entirety. The imager is aligned with the lens at the lens holder and the lens is optically aligned and focused with the imager and the housing portions are joined or bonded, such as by utilizing aspects of the cameras and processes described in U.S. Pat. Nos. 10,272,857; 10,264, 219; 9,451,138; 9,277,104 and/or 8,542,451, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, which are all hereby incorporated herein by reference in their entireties.

Although shown and described as a vehicular camera, it should be understood that aspects of the cameras, methods, and systems described herein may be suitable for use in other applications, such as non-automotive camera applications or lidar laser modules. For example, aspects of the present disclosure may be suitable for use in the alignment of a laser diode PCB to a collimator (or other type of optic), such as for a vehicular Lidar sensor or the like, and/or may be suitable for use in the alignment of a telephoto lens to a photodetector (or other highly sensitive light sensor).

For example, a lidar sensor assembled utilizing aspects discussed above may detect presence of and/or range to other vehicles and objects, and the sensor and/or sensing system may utilize aspects of the sensors and systems described in U.S. Pat. Nos. 9,753,121; 9,689,967; 9,599, 702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for assembling a vehicular camera, the method comprising:
   providing an imager printed circuit board, wherein the imager printed circuit board comprises a first side and a second side opposite the first side and separated from the first side by a thickness of the imager printed circuit board, and wherein an imager is disposed at the first side of the imager printed circuit board;
   providing a lens barrel accommodating a lens and having an inner end, the lens barrel having at least two radial protrusions protruding radially outward at or near the inner end of the lens barrel;
   providing a lens holder having at least two slots extending longitudinally along the lens holder from a board end of the lens holder;
   inserting the inner end of the lens barrel into the lens holder such that the radial protrusions are disposed within respective ones of the slots;
   after the lens barrel is inserted into the lens holder, securing the lens holder relative to the imager printed circuit board;
   optically aligning and focusing the lens at the imager via movement of the lens barrel relative to the lens holder;
   after the lens is optically aligned and focused relative to the imager at the imager printed circuit board, welding the radial protrusions to the lens holder to secure the lens barrel relative to the imager printed circuit board; and
   wherein the slots taper at their ends opposite the board end of the lens holder, and wherein, with the lens holder secured relative to the imager printed circuit board and prior to optically aligning and focusing the lens at the imager, the radial protrusions are positioned at the tapered ends of the slots to locate the lens barrel relative to the lens holder.

2. The method of claim 1, wherein welding the radial protrusions to the lens holder comprises laser welding the radial protrusions within the slots and to the lens holder to secure the lens barrel relative to the imager printed circuit board.

3. The method of claim 1, wherein, with the lens holder secured relative to the imager printed circuit board, the board end of the lens holder is attached at the imager printed circuit board with the first side of the imager printed circuit board and the imager facing the lens.

4. The method of claim 1, wherein the radial protrusions protrude radially outward from a retaining element, and wherein the lens barrel is secured to the retaining element prior to inserting the inner end of the lens barrel into the lens holder.

5. The method of claim 1, comprising, after securing the lens holder relative to the imager printed circuit board, mating a rear housing with the lens holder.

6. The method of claim 1, comprising, after securing the lens holder relative to the imager printed circuit board and before optically aligning and focusing the lens relative to the imager, adjusting the lens barrel relative to the lens holder to center the radial protrusions within the slots.

7. The method of claim 6, wherein adjusting the lens barrel relative to the lens holder to center the radial protrusions within the slots is done responsive at least in part to an imaging sensor viewing one of the slots and the respective radial protrusion disposed therein.

8. A method for assembling a vehicular camera, the method comprising:
   providing an imager printed circuit board, wherein the imager printed circuit board comprises a first side and a second side opposite the first side and separated from the first side by a thickness of the imager printed circuit board, and wherein an imager is disposed at the first side of the imager printed circuit board;
   providing a lens barrel accommodating a lens and having an inner end, the lens barrel having at least two radial protrusions protruding radially outward at or near the inner end of the lens barrel;
   providing a lens holder having at least two slots extending longitudinally along the lens holder from a board end of the lens holder;
   inserting the inner end of the lens barrel into the lens holder such that the radial protrusions are disposed within respective ones of the slots;
   after the lens barrel is inserted into the lens holder, securing the lens holder relative to the imager printed circuit board;
   optically aligning and focusing the lens at the imager via movement of the lens barrel relative to the lens holder;
   after the lens is optically aligned and focused relative to the imager at the imager printed circuit board, welding the radial protrusions to the lens holder to secure the lens barrel relative to the imager printed circuit board; and
   after securing the lens holder relative to the imager printed circuit board and before optically aligning and focusing the lens relative to the imager, adjusting the lens barrel relative to the lens holder to center the radial protrusions within the slots.

9. The method of claim 8, wherein adjusting the lens barrel relative to the lens holder to center the radial protrusions within the slots is done responsive at least in part to an imaging sensor viewing one of the slots and the respective radial protrusion disposed therein.

10. The method of claim 8, wherein, with the lens holder secured relative to the imager printed circuit board, the board end of the lens holder is attached at the imager printed circuit board with the first side of the imager printed circuit board and the imager facing the lens.

11. The method of claim 8, wherein the slots taper at their ends opposite the board end of the lens holder, and wherein, with the lens holder secured relative to the imager printed circuit board and prior to optically aligning and focusing the lens at the imager, the radial protrusions are positioned at the tapered ends of the slots to locate the lens barrel relative to the lens holder.

12. The method of claim 8, wherein welding the radial protrusions to the lens holder comprises laser welding the radial protrusions within the slots and to the lens holder to secure the lens barrel relative to the imager printed circuit board.

13. The method of claim 8, wherein the radial protrusions protrude radially outward from a retaining element, and wherein the lens barrel is secured to the retaining element before the lens barrel is received in the lens holder.

14. The method of claim 8, comprising, after securing the lens holder relative to the imager printed circuit board, mating a rear housing with the lens holder.

15. A method for assembling a vehicular camera, the method comprising:
providing an imager printed circuit board, wherein the imager printed circuit board comprises a first side and a second side opposite the first side and separated from the first side by a thickness of the imager printed circuit board, and wherein an imager is disposed at the first side of the imager printed circuit board;
providing a lens barrel accommodating a lens and having an inner end, the lens barrel having at least two radial protrusions protruding radially outward at or near the inner end of the lens barrel;
providing a lens holder having at least two slots extending longitudinally along the lens holder from a board end of the lens holder;
inserting the inner end of the lens barrel into the lens holder such that the radial protrusions are disposed within respective ones of the slots;
after the lens barrel is inserted into the lens holder, securing the lens holder relative to the imager printed circuit board;
optically aligning and focusing the lens at the imager via movement of the lens barrel relative to the lens holder;
after the lens is optically aligned and focused relative to the imager at the imager printed circuit board, welding the radial protrusions to the lens holder to secure the lens barrel relative to the imager printed circuit board; and
wherein the radial protrusions protrude radially outward from a retaining element, and wherein the lens barrel is secured to the retaining element before the lens barrel is received in the lens holder.

16. The method of claim 15, wherein, with the lens holder secured relative to the imager printed circuit board, the board end of the lens holder is attached at the imager printed circuit board with the first side of the imager printed circuit board and the imager facing the lens.

17. The method of claim 15, wherein, after securing the lens holder relative to the imager printed circuit board and before optically aligning and focusing the lens relative to the imager, adjusting the lens barrel relative to the lens holder to center the radial protrusions within the slots.

18. The method of claim 17, wherein adjusting the lens barrel relative to the lens holder to center the radial protrusions within the slots is done responsive at least in part to an imaging sensor viewing one of the slots and the respective radial protrusion disposed therein.

19. The method of claim 15, comprising, after securing the lens holder relative to the imager printed circuit board, mating a rear housing with the lens holder.

20. The method of claim 15, wherein the slots taper at their ends opposite the board end of the lens holder, and wherein, with the lens holder secured relative to the imager printed circuit board and prior to optically aligning and focusing the lens at the imager, the radial protrusions are positioned at the tapered ends of the slots to locate the lens barrel relative to the lens holder.

21. The method of claim 15, wherein welding the radial protrusions to the lens holder comprises laser welding the radial protrusions within the slots and to the lens holder to secure the lens barrel relative to the imager printed circuit board.

* * * * *